(12) United States Patent
Nakamori

(10) Patent No.: US 9,983,837 B2
(45) Date of Patent: May 29, 2018

(54) SYSTEM AND METHOD OF UPDATING SETTING INFORMATION IN AN INFORMATION PROCESSING APPARATUS

(71) Applicant: CANON KABUSHIKI KAISHA, Tokyo (JP)

(72) Inventor: Yuki Nakamori, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/194,316

(22) Filed: Jun. 27, 2016

(65) Prior Publication Data
US 2017/0003917 A1    Jan. 5, 2017

(30) Foreign Application Priority Data

Jun. 30, 2015    (JP) .................................. 2015-132177

(51) Int. Cl.
| | |
|---|---|
| G06F 11/00 | (2006.01) |
| G06F 3/12 | (2006.01) |
| H04L 29/06 | (2006.01) |
| H04L 29/08 | (2006.01) |
| H04L 12/26 | (2006.01) |
| G06F 9/44 | (2018.01) |
| G06F 9/445 | (2018.01) |
| G06F 11/14 | (2006.01) |
| H04N 1/00 | (2006.01) |

(52) U.S. Cl.
CPC ............. *G06F 3/123* (2013.01); *G06F 3/121* (2013.01); *G06F 3/1205* (2013.01); *G06F 3/1225* (2013.01); *G06F 3/1231* (2013.01); *G06F 3/1253* (2013.01); *G06F 9/4411* (2013.01); *G06F 9/44505* (2013.01); *G06F 11/1469* (2013.01); *H04L 43/0817* (2013.01); *H04L 67/1095* (2013.01); *H04L 67/1097* (2013.01); *H04L 67/42* (2013.01); *H04N 1/00244* (2013.01); *G06F 2201/82* (2013.01)

(58) Field of Classification Search
None
See application file for complete search history.

(56) References Cited

U.S. PATENT DOCUMENTS

| | | | |
|---|---|---|---|
| 2008/0301493 A1 | 12/2008 | Horiuchi | |
| 2011/0219019 A1* | 9/2011 | Peng | G06F 15/16 707/769 |
| 2013/0128313 A1 | 5/2013 | Hirokawa | |
| 2016/0094623 A1* | 3/2016 | Takayama | H04L 67/10 709/203 |
| 2016/0210204 A1* | 7/2016 | Clark | G06F 11/1451 |
| 2017/0346694 A1* | 11/2017 | Buendgen | H04L 41/0856 |

FOREIGN PATENT DOCUMENTS

| | | |
|---|---|---|
| EP | 3070619 A1 | 9/2016 |
| JP | 2004-86800 A | 3/2004 |
| JP | 2004-94294 A | 3/2004 |
| JP | 2007-43287 A | 2/2007 |

* cited by examiner

*Primary Examiner* — Barbara Reinier
(74) *Attorney, Agent, or Firm* — Canon USA Inc., IP Division

(57) ABSTRACT

In a system where information is shared between a server and a client, backup and restoration of information held in the server are executed. In a case where the restoration is executed, control is performed such that configuration information held in the client after a time when the backup is executed is held in the server after the restoration.

11 Claims, 12 Drawing Sheets

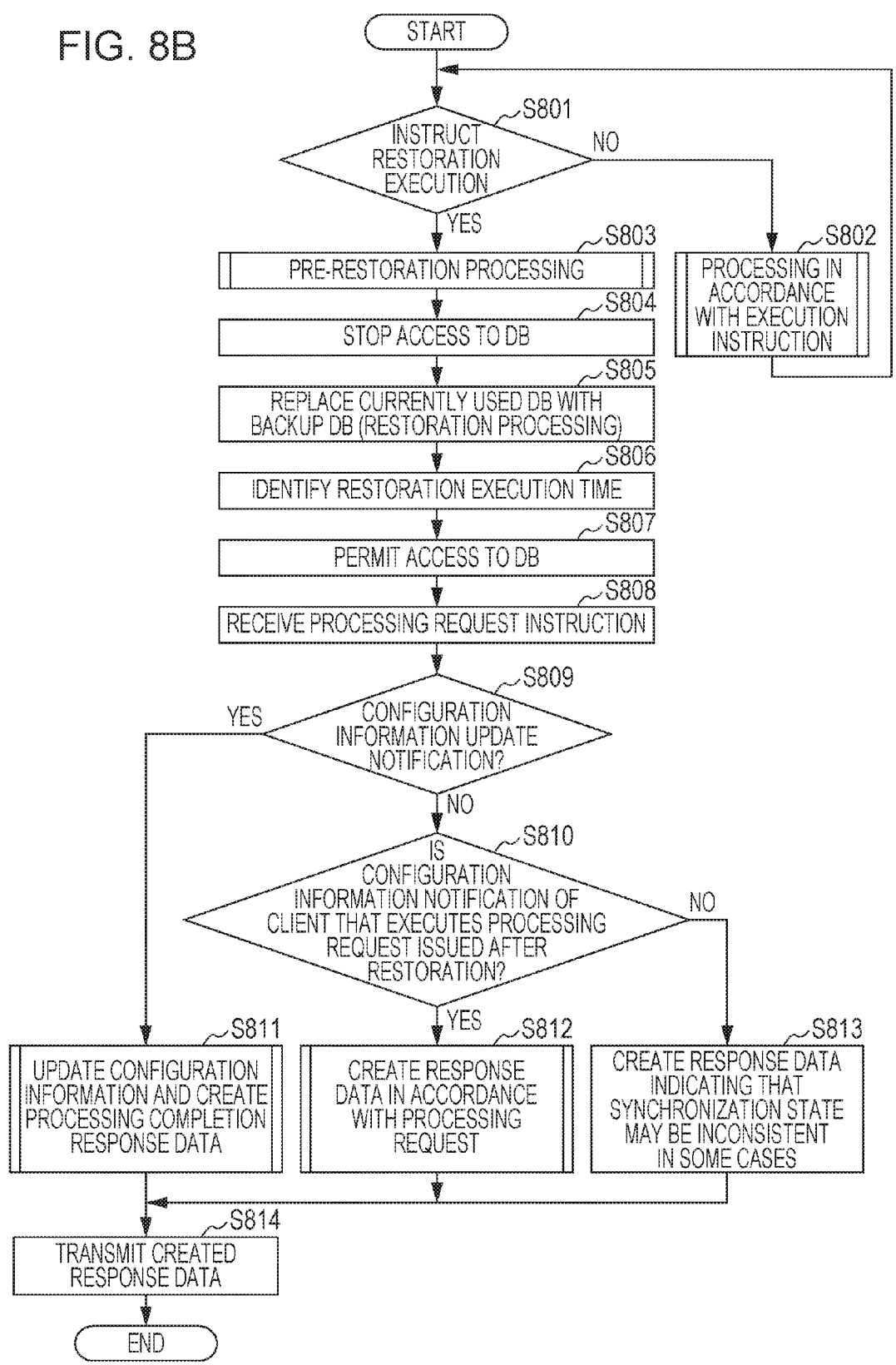

SYSTEM AND METHOD OF UPDATING SETTING INFORMATION IN AN INFORMATION PROCESSING APPARATUS

BACKGROUND OF THE INVENTION

Field of the Invention

The present disclosure relates to a maintenance function for information shared between information processing apparatuses.

Description of the Related Art

Up to now, a sharing system in which information is shared between information processing apparatuses has been proposed. A server described in Japanese Patent Laid-Open No. 2004-86800 holds an update content of a database held in the server as an update history. Subsequently, this update history is transmitted from the server to a client. In this manner, the information held in the server is matched with the information held in the client.

Japanese Patent Laid-Open No. 2004-94294 describes an information sharing system in which a content of setting information held in a client is transmitted from the client to a server.

In addition, up to now, a technology for backing up and restoring setting information of a device has been proposed. Japanese Patent Laid-Open No. 2007-43287 describes a technology for executing restoration processing on the basis of a predetermined restoration rule when backed-up setting information of an image processing apparatus is restored.

The image processing apparatus described in Japanese Patent Laid-Open No. 2007-43287 determines whether a MAC address, an IP address, an optional device, or the like of an apparatus on which the information is reflected is changed before and after the restoration. Subsequently, it is determined whether or not the restoration is executed for each setting item on the basis of a determination result.

According to a technology in a related art, after information of a server is restored by backup information, information indicating a configuration of a client which is held in the server (hereinafter, will be referred to as configuration information) and a configuration of the actual client may be inconsistent with each other in some cases. The configuration information of the client includes, for example, version information of the client, information on the presence or absence of a facsimile (FAX) unit, information on the presence or absence of a finisher, or the like.

When restoration is performed in the server, the information held in the server is restored to the content at a time of backup, and the content updated at or after the time of the backup is discarded. On the other hand, the client continues holding the configuration updated at or after the time of the backup. Therefore, in a case where the configuration of the client is updated between the backup and the restoration, inconsistency may occur between the configuration information of the client which is held in the server after the restoration and the configuration of the actual client in some cases.

When the configuration information of the client which is held in the server and the configuration of the actual client are inconsistent with each other, a problem occurs that sharing of the setting information in accordance with the configuration of the client may not be performed in some cases.

According to Japanese Patent Laid-Open No. 2004-86800 and Japanese Patent Laid-Open No. 2004-94294, no consideration has been made on a configuration in which the information held in the server is backed up.

Japanese Patent Laid-Open No. 2007-43287 describes a configuration in which a user is asked whether or not the restoration is executed in a case where a change or the like is made to an optional device in its own apparatus. However, Japanese Patent Laid-Open No. 2007-43287 does not disclose a method of executing the restoration while securing the consistency between the configuration information held in another apparatus (server) and the configuration of its own apparatus.

SUMMARY OF THE INVENTION

An information processing apparatus according to an exemplary embodiment of the present invention has the following configuration. That is, there is provided an information processing apparatus including: a reception unit configured to receive from an image forming apparatus: setting information used for the image forming apparatus to operate; and configuration information indicating a function of the image forming apparatus; a holding unit configured to hold the setting information and the configuration information received by the reception unit; a first control unit configured to perform control in a manner that the setting information and the configuration information held in the holding unit are stored as a backup information in a storage unit; and a second control unit configured to perform control in a manner that, in a case where restoration with respect to the holding unit is executed by using the backup information stored in the storage unit, the configuration information held in the image forming apparatus after a time when the backup information is stored in the storage unit is held in the holding unit after the restoration.

Further features of the present invention will become apparent from the following description of exemplary embodiments with reference to the attached drawings.

BRIEF DESCRIPTION OF THE DRAWINGS

FIGS. 8A and 8B are flow charts for describing the restoration processing according to a second exemplary embodiment.

DESCRIPTION OF THE EMBODIMENTS

Figure 1:
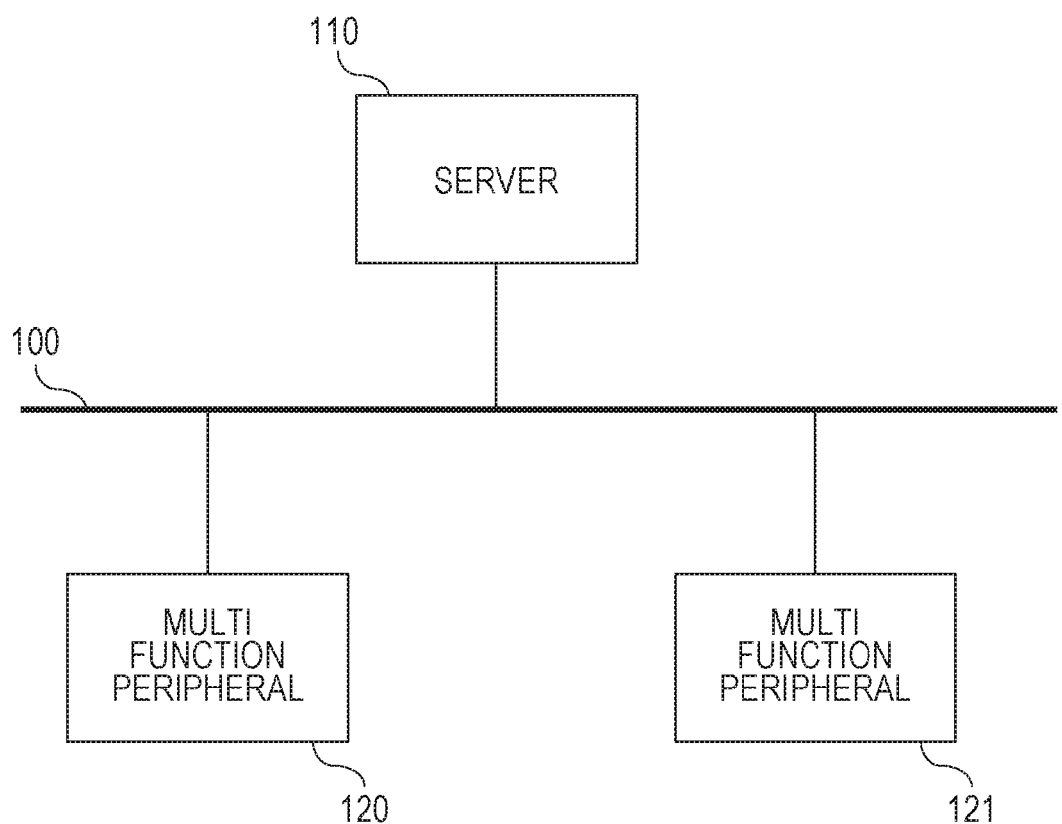
FIG. 1 illustrates a configuration of an information sharing system according to a first exemplary embodiment.

Exemplary embodiments of the present invention will be described in detail with reference to the accompanying drawings. The present invention is not limited to these exemplary embodiments, and various modifications and alterations can be made within the gist of the invention.

First Exemplary Embodiment

In an information sharing system (information processing system) according to the present exemplary embodiment, setting information and configuration information are shared between a server and a client. The setting information is information used for the client to operate. The configuration information is information indicating a function of the client. In the information sharing system according to the present exemplary embodiment, the information held in the server and the information held in the client are mutually shared at every predetermined timing. In this manner, even when information held in one of the server and the client is changed over an elapse of time, the information after the change is shared by the other side. Hereinafter, processing for the information sharing between the server and the client will be referred to as synchronization processing.

In the information sharing system according to the present exemplary embodiment, the setting information is shared among a plurality of clients connected to the server. The server also shares the content of the setting information shared by a first client with a second client. In this manner, the first client and the second client share the common setting information.

According to the present exemplary embodiment, the server is, for example, a personal computer (PC), and an image forming apparatus such as a multi function peripheral (MFP) can be used as the client, for example. In a case where the information managed by the server is backed up, and the backed-up information is restored in the server, with regard to information of a predetermined type, the information sharing system according to the present exemplary embodiment restores the information of the content updated after the backup time point in the server. The information of the predetermined type is, for example, the configuration information of the client. Hereinafter, an example in which the client is a multi function peripheral will be described. This multi function peripheral is an image forming apparatus having a printing function.

The configuration information is information indicating functions that can be executed by respective multi function peripherals or setting information that can be set. An example of the configuration information includes version information of firmware, information on the presence or absence of a FAX unit, information on the presence or absence of a finisher, or the like. The server according to the present exemplary embodiment determines a type of the setting information shared by the respective multi function peripherals on the basis of the configuration information of each of the multi function peripherals. For example, such control is performed that address book information used for a FAX communication is shared with a multi function peripheral having the FAX unit as the setting information, but the address book information used for the FAX communication is not shared with a multi function peripheral that does not have the FAX unit. Herein, the setting information refers to a parameter used for multi function peripheral to operate.

When the information held in the server is entirely rewritten with the information at the time of the backup in the restoration processing, the configuration information of each of the multi function peripherals is also rewritten into the information at the time of the backup. However, in a case where the configuration of the multi function peripheral is changed at a time between the backup and the restoration and the configuration information is updated, the following inconsistency occurs.

That is, the inconsistency occurs between the configuration information of the multi function peripheral which is held in the server and the configuration of the actual multi function peripheral. For example, a case will be described in which a multi function peripheral A does not include a FAX unit at the time of backup, but the FAX unit is attached to the multi function peripheral A after the backup. In this case, information indicating that the FAX unit is not provided as the configuration information of the multi function peripheral A is recorded as the backup information. Subsequently, after the FAX unit is attached to the multi function peripheral A, processing of restoring the backup information in the server is performed. Then, the server holds the information indicating that the multi function peripheral A does not include the FAX unit, but a state is established in which the actual multi function peripheral A includes the FAX unit. In this manner, the inconsistency occurs between the configuration information of the multi function peripheral which is held in the server and the configuration of the actual multi function peripheral.

When the above-described inconsistency occurs, the setting information that should be shared between the server and the multi function peripheral is not shared. For example, since the multi function peripheral A includes the FAX unit, the server preferably notifies the multi function peripheral A of the address book information used for the FAX communication as the setting information. However, since the server holds the information indicating that the multi function peripheral A does not include the FAX unit, the server does not notify the multi function peripheral A of the address book information for the FAX communication. In this manner, the setting information that should be shared between the server and the multi function peripheral is not shared after the restoration processing.

In view of the above, in a case where the information sharing system according to the present exemplary embodiment backs up the information managed by the server and the backed-up information is restored in the server, with regard to the configuration information, the information of the content updated after the backup time point is restored in the server. With the above-described configuration, since the configuration information matched with the current configuration of the multi function peripheral is held in the server even when the restoration processing is performed, appropriate information sharing between the server and the multi function peripheral can be carried out even after the restoration processing.

FIG. 1 illustrates a configuration example of a system according to the present exemplary embodiment. In the example of FIG. 1, a multi function peripheral 120 and a multi function peripheral 121 are connected to a server 110 via a network 100. The number of multi function peripherals connected to the network 100 may be one. As an alternative configuration to the above, the number of multi function peripherals connected to the network 100 may be three or more.

The multi function peripheral 120 and the multi function peripheral 121 according to the present exemplary embodiment have a scanner function of reading information such as a character, a graphic, or a photograph and a printing function of printing out the input information. The functions provided to the multi function peripheral 120 and the multi function peripheral 121 are not limited to these. For example, a facsimile (FAX) function or the like may be further provided. The term image forming apparatus is exemplified by multi function peripheral 120 and multi function peripheral.

The server 110 (information processing apparatus) according to the present exemplary embodiment manages setting information of the multi function peripheral 120 and the multi function peripheral 121. The setting information according to the present exemplary embodiment is information used for each of the multi function peripheral 120 and the multi function peripheral 121 to operate and includes a serial number of the multi function peripheral, an IP address, address book information, or the like.

The server 110 according to the present exemplary embodiment also manages configuration information of the multi function peripheral 120 and the multi function peripheral 121. The configuration information is information indicating functions that can be executed by the respective multi function peripherals and the setting information that can be set. An example of the configuration information includes version information of firmware, information on the presence or absence of a FAX unit, information on the presence or absence of a finisher, or the like.

Figure 2A:
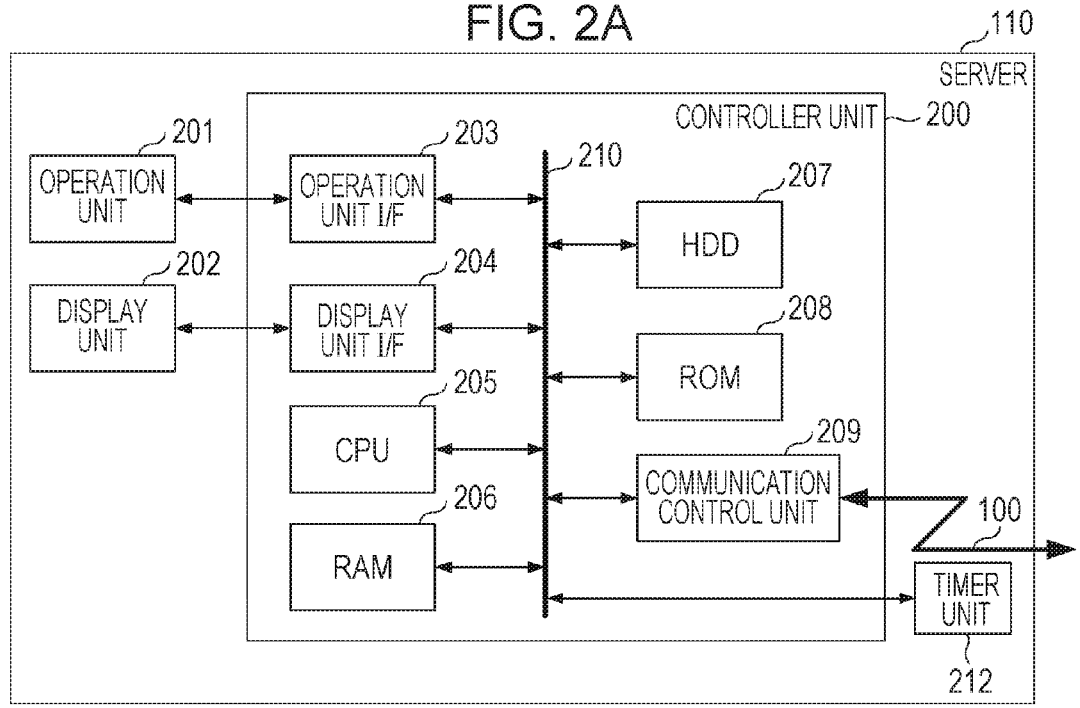
FIGS. 2A and 2B illustrate a hardware configuration of the information sharing system according to the first exemplary embodiment.

A configuration of the server 110 according to the present exemplary embodiment will be described with reference to FIG. 2A.

The server 110 includes a controller unit 200, an operation unit 201, a display unit 202, and a timer unit 212. The controller unit 200 controls an operation of the server 110. A configuration of the controller unit 200 will be described in detail below.

The operation unit 201 inputs an operation instruction with respect to the server 110. The operation unit 201 is constituted, for example, by a keyboard, a mouse, a touch panel, or the like. An administrator of the information sharing system operates the operation unit 201 so that it is possible to perform maintenance of the information held in the server 110, change of the information, or the like. The administrator also operates the operation unit 201 so that it is possible to input an instruction for backing up the information held in the server 110 or restoring the backed-up information in the server 110 to the server 110. The information held in the server 110 includes the setting information and the configuration information described above.

The display unit 202 is, for example, a display or the like and displays a graphical user interface (GUI) used when an administrator performs operation with respect to the server 110, an error message, or the like.

The timer unit 212 performs timekeeping. For example, a real time clock (RTC) can be used as the timer unit 212.

Next, the configuration of the controller unit 200 will be described. A central processing unit (CPU) 205 realizes a function of an operating system (OS) by executing a boot program stored in a read only memory (ROM) 208. The CPU 205 also realizes an application program stored in a hard disk drive (HDD) 207 on the OS.

According to the present exemplary embodiment, the CPU 205 (first control unit) performs control to back up the setting information and the configuration information held in the HDD 207 in a storage unit. The storage unit at the backup destination may be installed inside the server 110. As an alternative configuration to the above, the storage unit at the backup destination may be a storage apparatus installed outside the server 110 and connected to the server 110. Accordingly, the backup destination, whether installed inside or outside of the information processing apparatus 110, exemplifies a storage unit. This storage unit is configured to store backup information which includes setting information and configuration information. The setting information is used for the image forming apparatus to operate. The configuration information indicates a function of the image forming apparatus.

In addition, according to the present exemplary embodiment, the CPU 205 performs control to execute the restoration with respect to the HDD 207 by using the backed-up information.

A random access memory (RAM) 206 is a memory used for expanding the program executed by the CPU 205. The HDD 207 stores the above-described application program. The HDD 207 (holding unit) also holds the setting information and the configuration information of the multi function peripheral 120 and the multi function peripheral 121. A detail with regard to the management of the setting information and the configuration information will be described below. The ROM 208 stores the above-described boot program.

An operation unit I/F 203 is an interface with the operation unit 201 and notifies the CPU 205 of the information input from the operation unit 201. A display unit I/F 204 outputs image information that should be displayed on the display unit 202 to the display unit 202.

A communication control unit 209, which performs as a reception unit and a transmission unit, performs transmission and reception of information with the multi function peripheral 120 and the multi function peripheral 121 via the network 100. The information transmitted and received by the communication control unit 209 includes the setting information and the configuration information of the multi function peripheral 120 and the multi function peripheral 121. The setting information and the configuration information received by the communication control unit 209 (reception unit) are held in the HDD 207. The communication control unit 209 (transmission unit) also transmits the setting information held in the HDD 207 (holding unit) to the multi function peripheral 120 and the multi function peripheral 121. A system bus 210 connects the respective components in the above-described controller unit 200 to one another.

Figure 2B:
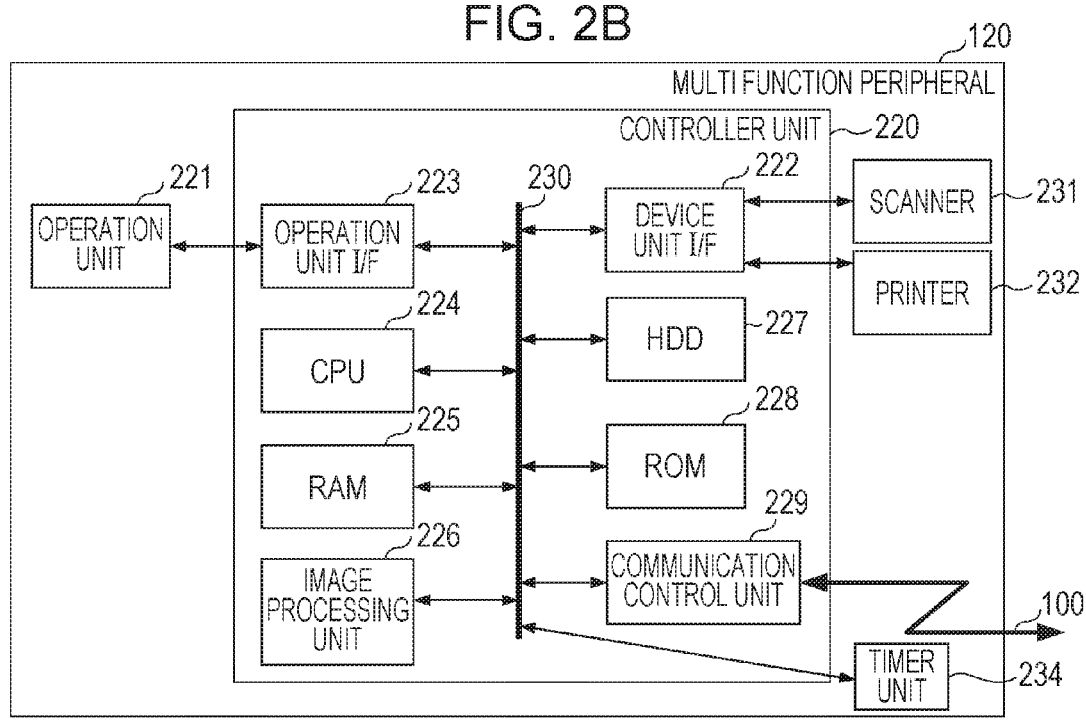

Next, a configuration of the multi function peripheral 120 will be described with reference to FIG. 2B. The configuration of the multi function peripheral 121 is similar to a configuration of the multi function peripheral 120 which will be described below.

The multi function peripheral 120 includes an operation unit 221, a controller unit 220, a scanner 231, and a printer 232.

The operation unit 221 inputs an operation instruction with respect to the multi function peripheral 120. The operation unit 221 is constituted, for example, by a button, a touch panel, or the like. According to the present exemplary embodiment, a case will be described where the operation unit 221 is a touch panel having an image display function. A display unit may be provided separately in addition to the operation unit 221. The operation instruction with respect to the multi function peripheral 120 includes a printing instruction, a scanning instruction, or the like. In addition, the operation instruction with respect to the multi function peripheral 120 includes a changing instruction of the setting information used by the multi function peripheral 120 or the like. The printing instruction or the scanning instruction may be input to the multi function peripheral 120 from an external apparatus via the network 100.

The scanner 231 realizes the scanner function of reading the information such as the character, the graphic, or the photograph. The printer 232 realizes the printing function of printing out the information input by the scanner 231 or the information input from the external apparatus via the network 100. Furthermore, the FAX unit configured to perform a FAX transmission for transmitting an image to the outside via a telephone line or the like can be connected to the multi function peripheral 120.

The controller unit 220 controls the operation of the multi function peripheral 120. A CPU 224 executes the boot program stored in the ROM 208 to realize the function of the OS. The CPU 224 also realizes the application program stored in the HDD 227 on the OS.

A RAM 225 is a memory used for expanding the program executed by the CPU 224. The HDD 227 stores the above-described application program. The HDD 227 also holds the setting information and the configuration information of the multi function peripheral 120. A detail of the management of the setting information and the configuration information will be described below. A ROM 228 stores the above-described boot program.

An operation unit I/F 223 is an interface with the operation unit 221 and outputs image information that should be displayed on the operation unit 221 to the operation unit 221. The operation unit I/F 223 also notifies the CPU 224 of the operation instruction input from the operation unit 221. The scanner 231 and the printer 232 are connected to a device I/F 222. In addition, according to the present exemplary embodiment, the FAX unit or the like can be detachably attached to the device I/F 222.

A communication control unit 229 is connected to the network 100 and performs a communication with the server 110 via the network 100. The information communicated by the communication control unit 229 includes the setting information and the configuration information of the multi function peripheral 120.

An image processing unit 226 performs image processing such as input image processing from the scanner 231, output image processing to the printer 232, image rotation, image compression, resolution conversion, color space conversion, and gradation conversion. A system bus 230 connects the respective components included in the above-described controller unit 220 to one another.

With the above-described configuration, at least one of the setting information and the configuration information held in the multi function peripheral 120 is updated, and the server 110 is notified of the update content. The server 110 updates the setting information or the configuration information held in the HDD 207 of the server 110 with the notified update content. Furthermore, the server 110 notifies the multi function peripheral 121 of the setting information or the configuration information after the update. In this manner, the contents of the setting information and the configuration information held in the multi function peripheral 120, the multi function peripheral 121, and the server 110 are synchronized with one another.

Next, a software configuration of the server 110 will be described with reference to FIG. 3A. A server application 310 is an application saved in the ROM 208, the HDD 207, or the like of the server 110 (information processing apparatus) and executed by the CPU 205.

A processing unit 311 executes processing such as addition, deletion, or update of information held in a database 314 which will be described below. A detail of the information held in the database 314 will be described below with reference to Table 1 to Table 5.

A first management unit 312 performs an execution instruction such as addition, deletion, update, or the like of the setting information held in the database 314 with respect to the processing unit 311.

A second management unit 316 creates response information to the multi function peripheral 120 with regard to the update notification of the setting information or the configuration information from the multi function peripheral 120, the obtaining request of the information held in the database 314, or the like.

A third management unit 317 controls the execution of backup and restoration of the information with respect to the database 314.

A communication processing unit 315 performs communication processing with a client application 320 which will be described below with reference to FIG. 3B (ie. the client application 320 of multi function peripheral 120 exemplifies the software configuration of the image forming apparatus 120). The communication processing unit 315 receives the update notification indicating that the information managed by the client application 320 is updated from the client application 320. The communication processing unit 315 also replies the update content of the information managed by the server application 310 to the client application 320 in response to an inquiry from the client application. The information managed by the client application 320 includes the setting information and the configuration information of the multi function peripheral 120.

Figure 4A:
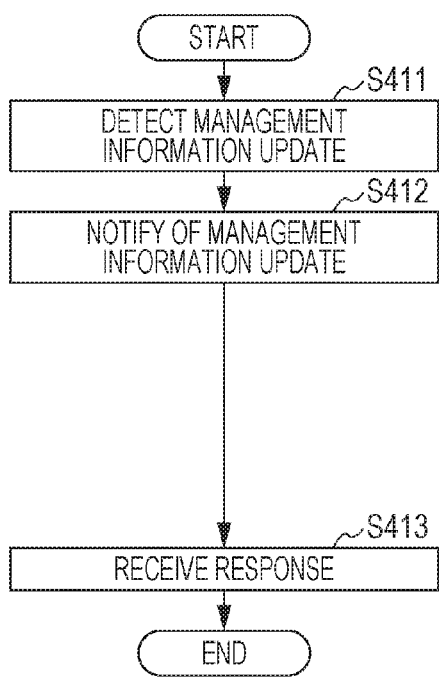
FIGS. 4A and 4B are flow charts for describing first synchronization processing according to the first exemplary embodiment.
Figure 4B:
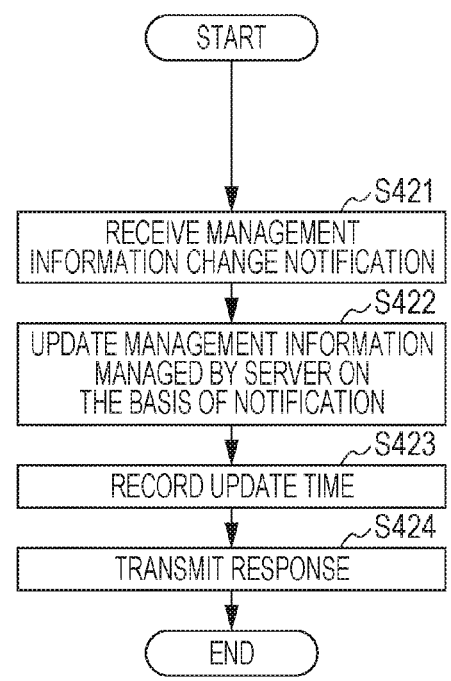
Figure 5A:
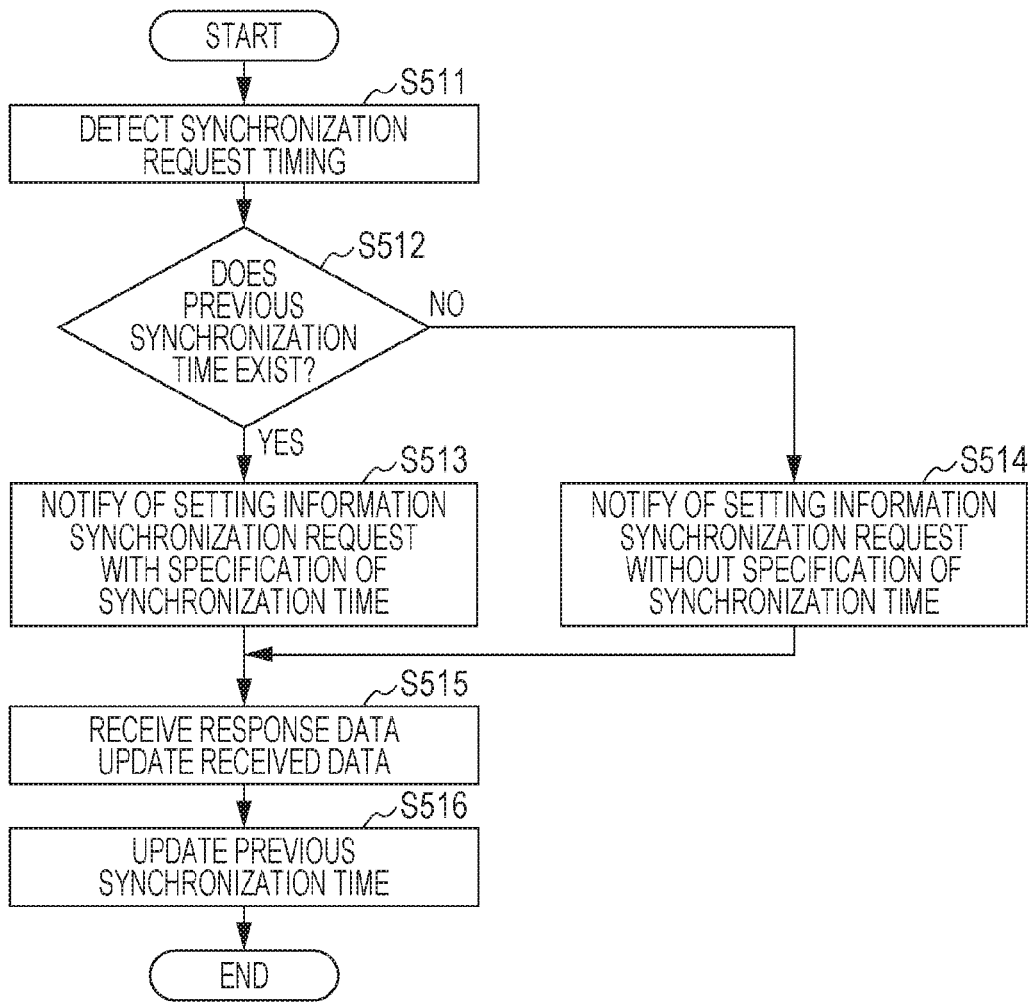
FIGS. 5A and 5B are flow charts for describing second synchronization processing according to the first exemplary embodiment.
Figure 5B:
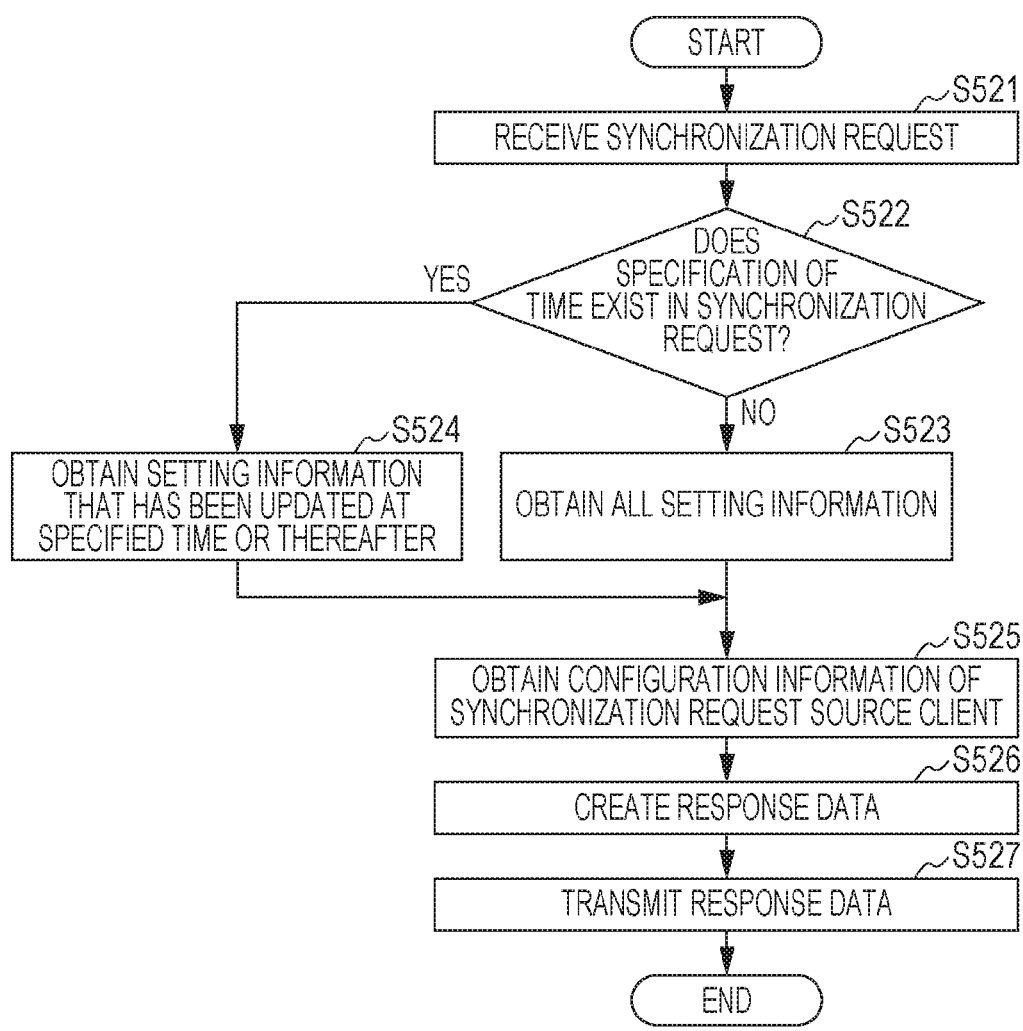

A control unit 313 (second control unit) controls the first management unit 312, the second management unit 316, the third management unit 317, and the communication processing unit 315 and executes processing illustrated in flow charts of FIG. 4B and FIG. 5B. A detail of the processing illustrated in the flow charts of FIG. 4B and FIG. 5B will be described below.

The database 314 holds respective pieces of information illustrated in Table 1 to Table 5. Table 1 is a table illustrating a correspondence among a serial number of a multi function peripheral, a device code, and version information.

TABLE 1

| SER. NO. | DEVICE CODE | VERSION INFORMATION |
| --- | --- | --- |
| 1,234,567 | DeviceA | Ver 00.01 |
| 3,124,567 | DeviceB | Ver 00.02 |
| ... | | |

The serial number is identification information for uniquely identifying one or a plurality of multi function peripherals connected to the server 110 via the network 100. For example, a multi function peripheral having a serial number 1234567 corresponds to the multi function peripheral 120. In addition, for example, a multi function peripheral having a serial number 3124567 corresponds to the multi function peripheral 121.

The device code is, for example, a code allocated to each type of products. In an example of Table 4, the multi function peripheral having the serial number 1234567 indicates a product of a type DeviceA. In addition, in the example of Table 4, the multi function peripheral having the serial number 3124567 indicates a product of a type DeviceB. The version information indicates firmware versions of the respective multi function peripherals respectively associated with the serial numbers.

Table 2 is a table illustrating a correspondence among a serial number of the multi function peripheral, a setting item, setting information, an initial value, and an update time.

TABLE 2

| SER. NO. | SETTING ITEM | SETTING INFORMATION | INITIAL VALUE | UPDATE TIME |
|---|---|---|---|---|
| 1,234,567 | settings.device.sirial | 1234567 | " | 2014 Dec. 31 9:00 |
| 1,234,567 | settings.device.name | DeviceA | " | 2014 Dec. 31 9:00 |
| 1,234,567 | settings.device.firmversion | Ver 00.01 | Ver 00.00 | 2015 Jan. 1 10:00 |
| 1,234,567 | settings.device.network.ipaddress | 192.168.111.222 | 255.255.255.255 | 2015 Jan. 1 12:00 |
| 1,234,567 | settings.device.phone.number | 03-0000-1111 | 00-0000-0000 | 2015 Feb. 1 13:00 |
| 1,234,567 | settings.fax.phone.number | 00-0000-0000 | 00-0000-0000 | 2014 Dec. 31 9:00 |
| 1,234,567 | settings.license.ipfax | OFF | OFF | 2014 Dec. 31 9:00 |
| 1,234,567 | settings.option.finisher | ON | OFF | 2015 Jan. 1 10:00 |
| 1,234,567 | Settings.option.faxunit | OFF | OFF | 2015 Jan. 1 12:00 |
| 3,124,567 | settings.device.sirial | 1234567 | " | 2015 Feb. 1 13:00 |
| . . . | | | | |

The setting item is identification information for identifying a type of the setting information. The setting information is information representing a current setting content (setting value or the like) with regard to each of the setting items. The initial value is a setting content previously set with regard to each of the setting items. Furthermore, the update time indicates a time when each of the setting values managed by the server is updated in the server.

For example, the fourth row from the top in Table 2 indicates a current value of the setting item settings.device.network.ipaddress (setting with regard to an IP address) of the multi function peripheral having the serial number 1234567. The current value is 192.168.111.222. It is also indicated that the initial value of the IP address of this multi function peripheral is 255.255.255.255. Furthermore, it is indicated that the IP address of this multi function peripheral is updated on Jan. 1, 2015 at 12:00.

Table 3 is a table illustrating a correspondence among a serial number, an information title, and configuration information.

TABLE 3

| SER. NO. | INFORMATION TITLE | CONFIGURATION INFORMATION |
|---|---|---|
| 1,234,567 | FIRMWARE VERSION | Ver 00.01 |
| 1,234,567 | DEVICE CODE | DeviceA |
| 1,234,567 | DEVICE ID | aaaaaaaa-bbbb-cccc-dddd-eeeeeeeeeeee-0000 |
| 1,234,567 | CONNECTION OPTION DEVICE | settings.option.finisher |
| 1,234,567 | CONNECTION OPTION DEVICE | . . . |
| . . . | | |
| 3,124,567 | FIRMWARE VERSION | Ver 00.02 |
| 3,124,567 | DEVICE CODE | DeviceB |
| 3,124,567 | DEVICE ID | aaaaaaaa-cccc-bbbb-dddd-eeeeeeeeeeee-0000 |
| 3,124,567 | CONNECTION OPTION DEVICE | settings.option.faxunit |
| 3,124,567 | CONNECTION OPTION DEVICE | settings.option.finisher |
| . . . | | |
| 3,124,567 | VALID LICENSE | settings.license.ipfax |
| . . . | | |

The information title is a title of each of the configurations of the multi function peripheral identified by the serial number. The information title includes, for example, a firmware version, a device code, a device ID, a connection optional device, or the like.

The configuration information represents a content of each pieces of information indicated by the information title. In an example illustrated in the first row from the top of Table 3, it is indicated that the firmware version of the multi function peripheral having the serial number 1234567 is Ver00.01. In addition, for example, in an example illustrated in the fourth row from the top of Table 3, it is indicated that a finisher is connected to the multi function peripheral as the connection optional device of this multi function peripheral (settings.option.finisher). In addition, for example, it is indicated that the FAX unit is connected to the device corresponding to the serial number 3124567, but the FAX unit is not connected to the device corresponding to the serial number 1234567.

The server 110 can determine the function that can be executed by the multi function peripheral 120 and the setting information that can be set in the multi function peripheral 120 on the basis of the configuration information. It is possible to determine the setting item of the setting information that can be synchronized between the server 110 and the multi function peripheral 120 by checking the configuration information of the multi function peripheral 120. In this manner, the configuration information is used for determining the use range of the setting information of the multi function peripheral 120 corresponding to the client.

An example of the configuration information includes the firmware version information, the information on the presence or absence of the FAX unit, or the like. The number of the usable functions and the setting information that can be set may be increased in some cases when the firmware version is increased, and the setting information that is no longer used when the firmware version is decreased also exists. The same applies to the information on the presence or absence of the FAX unit. In a state in which the FAX unit is not connected, the change or synchronization of the setting information associated with the FAX is not executed, and in a state in which the FAX unit is connected, the setting information associated with the FAX is synchronized to establish a state in which the change can be also made from the user.

Table 4 illustrates a correspondence among an address book ID with regard to the address book managed by the server 110, an address type, a display name, and an update time.

TABLE 4

| AD-DRESS BOOK ID | AD-DRESS TYPE | AD-DRESS | DISPLAY NAME | UPDATE TIME |
|---|---|---|---|---|
| 1 | E-Mail | aaa@xxx.co.jp | TARO TANAKA | 2014 Dec. 31 9:00 |
| 2 | FTP | 192.168.222.333 | SHARED SERVER | 2015 Feb. 1 15:00 |
| 3 | FAX | 03-0000-3333 | ICHIRO YAMADA | 2015 Feb. 1 13:00 |
| ... | | | | |

The multi function peripheral 120 according to the present exemplary embodiment has a function of transmitting image information or the like input from the scanner 231 to the external apparatus. A transmission method includes a transmission via an electronic mail (E-mail), a transmission using File Transfer Protocol (FTP), a FAX transmission, or the like. The multi function peripheral 120 according to the present exemplary embodiment holds the address book indicating a transmission destination of the image information. Information with regard to the address book is also managed by the server 110 as one of the setting information of the multi function peripheral 120.

The server 110 manages update information of the address book held in one or a plurality of multi function peripherals connected via the network. The address book ID in Table 4 is identification information for identifying the address book. The address type indicates a transmission method of transmitting information to the address managed by the address book. The address indicates an E-mail address at the information transmission destination, an IP address, a FAX number, or the like. The display name represents a title at the transmission destination. The update time represents a time when the content of each of the address books managed by the server is updated in the server.

Table 5 represents an address type, a synchronization condition, and state information.

TABLE 5

| ADDRESS TYPE | SYNCHRONIZATION CONDITION | STATE |
|---|---|---|
| FAX | settings.option.faxunit | ON |
| ... | | |

Table 5 illustrates that the server performs the synchronization processing of the setting information with the multi function peripheral associated with setting.option.faxunit (see Table 3) with regard to the address book (see Table 4) associated with the FAX the address type. The multi function peripheral associated with setting.option.faxunit is the multi function peripheral in which setting.option.faxunit is an ON state in Table 3.

That is, in an example of Table 5, the server 110 performs the synchronization processing with regard to the address information of the FAX with the multi function peripheral having the FAX unit (setting.option.faxunit) among one or a plurality of multi function peripherals connected via the network. On the other hand, the server 110 does not perform the synchronization processing with regard to the address information of the FAX with the multi function peripheral that does not have the FAX unit among one or a plurality of multi function peripherals connected via the network.

Next, a software configuration of the multi function peripheral 120 will be described with reference to FIG. 3B. The client application 320 is saved in the ROM 228, the HDD 227, or the like of the multi function peripheral 120 and executed by the CPU 224. The same also applies to a software configuration of a multi function peripheral other than the multi function peripheral 120 connected to the server 110.

A data processing unit 321 executes processing such as addition, deletion or update of information held in a database 324 which will be described below. Information held in the database 324 includes the setting information and the configuration information of the multi function peripheral 120. A detail of the information held in the database 324 will be described below with reference to Table 6 and Table 7.

A setting value data management unit 322 performs an execution instruction such as addition, deletion or update of the information held in the database 314 with respect to the data processing unit 321.

Figure 3A:
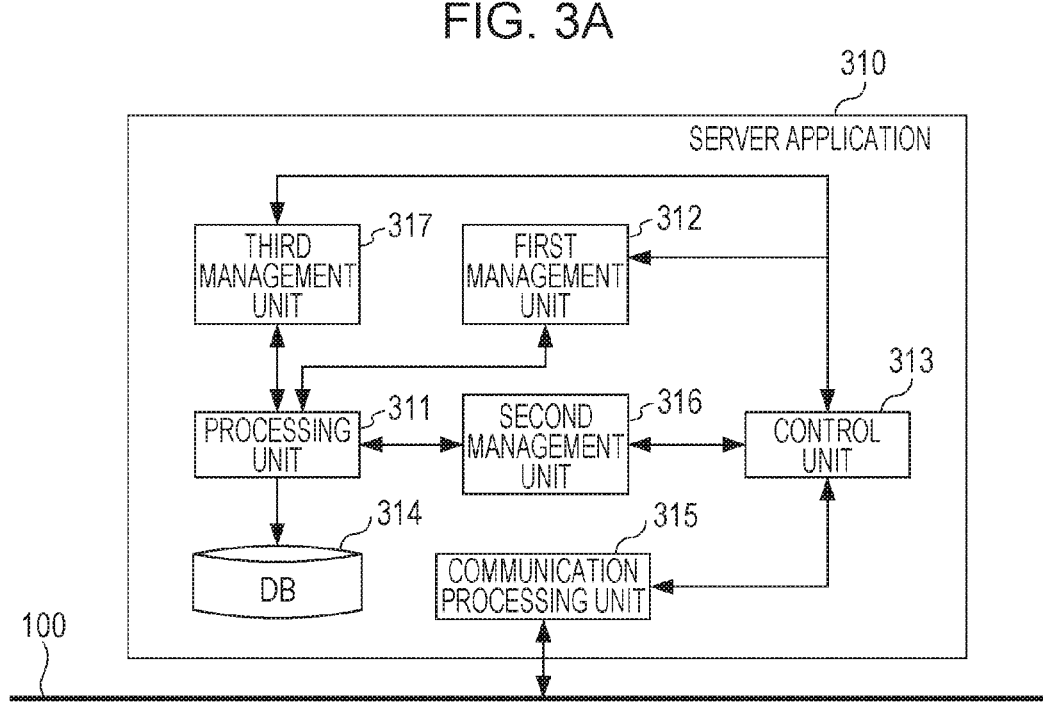
FIGS. 3A and 3B illustrate a software configuration of the information sharing system according to the first exemplary embodiment.
Figure 3B:
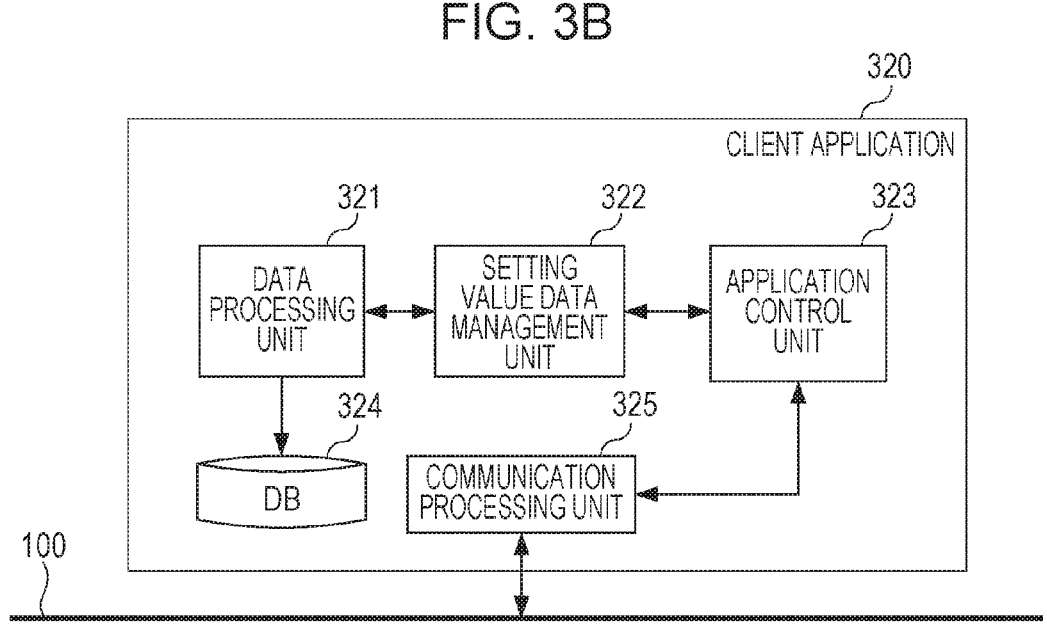

A communication processing unit 325 performs communication processing with the server application 310 illustrated in FIG. 3A (ie. the server application 310 of the information processing apparatus 110). The communication processing unit 325 transmits update information indicating that the information managed by the client application 320 is updated to the server application 310. The information managed by the client application 320 includes the setting information and the configuration information of the multi function peripheral 120. The communication processing unit 325 also makes an inquiry on whether or not the information managed by the server application 310 is updated. Furthermore, the communication processing unit 325 receives a response to the inquiry from the server application 310.

An application control unit 323 controls the setting value data management unit 322 and the communication processing unit 325 to execute processing illustrated in flow charts which will be described below with reference to FIG. 4A and FIG. 5A.

The database 324 holds respective pieces of information illustrated in Table 6 and Table 7.

Table 6 corresponds to the setting information and the configuration information held in the multi function peripheral 120. Table 6 illustrates a correspondence among a key identifier, a display title, management information (setting information and configuration information), and an initial value.

TABLE 6

| SETTING ITEM | DISPLAY TITLE | MANAGEMENT INFORMATION | INITIAL VALUE |
|---|---|---|---|
| settings.device.sirial | SERIAL ID | 1234567 | " |
| settings.device.name | DEVICE TITLE | Device A | " |

TABLE 6-continued

| SETTING ITEM | DISPLAY TITLE | MANAGEMENT INFORMATION | INITIAL VALUE |
|---|---|---|---|
| settings.device.frmversion | FIRMWARE VERSION | Ver 00.01 | Ver 00.00 |
| settings.device.network.ipaddress | IP ADDRESS | 192.168.111.222 | 120.0.0.1 |
| settings.device.phonenumber | TELEPHONE NUMBER | 03-0000-1111 | 00-0000-0000 |
| settings.fax.phonenumber | FAX TELEPHONE NUMBER | 00-0000-0000 | 00-0000-0000 |
| settings.license.ipfax | IP FAX LICENSE | OFF | OFF |
| settings.option.finisher | CASSETTE FEEDER 500 | ON | OFF |
| Settings.option.faxunit | FAX UNIT | OFF | OFF |
| . . . | | | |

The setting item is identification information for identifying each management information. The display title is a title of each of the setting items. The display title is a title displayed on an operation screen of the multi function peripheral 120 or a display apparatus connected to the multi function peripheral 120 in a case where an operation is performed with respect to the information managed by the multi function peripheral 120. The initial value is a previously set setting content with regard to each of the setting items.

In an example of Table 6, an IP address 192.168.111.222 is held as the setting information of the setting item corresponding to settings.device.network.ipaddress. The display title with regard to this setting item is "IP address". A currently set value is 192.168.111.222, and an initial value is 120.0.0.1.

Table 7 corresponds to information of the address book managed by the multi function peripheral 120. The information of the address book is managed by the multi function peripheral 120 as one of the setting information of the multi function peripheral 120.

TABLE 7

| ADDRESS BOOK ID | ADDRESS TYPE | ADDRESS | DISPLAY NAME |
|---|---|---|---|
| 1 | E-Mail | aaa@xxx.co.jp | TARO TANAKA |
| . . . | | | |

In an example of Table 7, information for performing transmission to the address aaa@xxx.co.jp by E-mail is saved in the information in which the address book ID is 1, and Taro Tanaka is displayed on the operation unit 221.

Next, the synchronization processing of the information which is executed between the server 110 and the multi function peripheral 120 will be described with reference to FIGS. 4A and 4B and FIGS. 5A and 5B. According to the present exemplary embodiment, the synchronization of the information is performed while the server 110 and the multi function peripheral 120 execute two types of processings. Hereinafter, information of a synchronization target will be referred to as management information. According to the present exemplary embodiment, the management information includes the setting information and the configuration information.

First processing is processing in which the multi function peripheral 120 notifies the server 110 of the update content in a case where the management information held in the multi function peripheral 120 is updated in the multi function peripheral 120. The first processing will be described in detail below with reference to FIGS. 4A and 4B.

Second processing is processing in which the multi function peripheral 120 obtains the update content of the management information from the server 110 while the multi function peripheral 120 asks the server 110 on the presence or absence of the update of the management information held in the server 110. The second processing will be described in detail below with reference to FIGS. 5A and 5B.

The first processing will be described with reference to FIGS. 4A and 4B. FIG. 4A illustrates processing executed by the multi function peripheral 120. The processing illustrated in FIG. 4A is realized when the CPU 224 executes a procedure illustrated in FIG. 4A by expanding the program stored in the HDD 227. The program may be stored in the ROM 228. As an alternative configuration to the above, part or all of the processing illustrated in FIG. 4A may be performed by hardware.

In a case where the synchronization processing between the server 110 and the multi function peripheral 120 is started, the multi function peripheral 120 notifies the server 110 of all the information of the synchronization target held in the multi function peripheral 120, for example, so that the synchronization processing can be started. It should be noted however that a method of starting the synchronization processing is not particularly limited.

Processing in a case where the content of the management information held in the multi function peripheral 120 is changed in a state in which the server 110 and the multi function peripheral 120 already share the management information will be described below.

The multi function peripheral 120 detects that the content of the management information is updated by the user operation with respect to the multi function peripheral 120 (S411). According to the configuration illustrated in FIG. 3B, when the management information saved in the database 324 is updated by the user operation, the setting value data management unit 322 detects the update of the management information via the data processing unit 321. For example, it is detected that the address (setting information) of the address book ID1 (setting item) among the information of the address book held in the multi function peripheral 120 illustrated in Table 7 is updated from aa@xxx.co.jp to aaa@xxx.co.jp.

Next, the multi function peripheral 120 notifies the server 110 of the update content of the management information (S412). According to the configuration illustrated in FIG. 3B, when the management information is updated, the control unit 313 controls the communication processing unit 325 to notify the server 110 of the update content. For example, the multi function peripheral 120 notifies server 110 that the address (setting information) of the address book ID1 (setting item) among the information of the address book held in the multi function peripheral 120 illustrated in Table 7 is updated from aa@xxx.co.jp to aaa@xxx.co.jp. The notification according to the present exemplary embodiment includes information indicating the time when the management information is updated in the multi function peripheral 120. The time when the management information is updated in the multi function peripheral 120 is counted by a timer unit 234.

The multi function peripheral 120 receives the response to the notification (S413). According to the configuration illustrated in FIG. 3B, the communication processing unit 325 receives the response from the server 110. The communication processing unit 325 notifies the application control unit 323 that the response from the server 110 is received.

FIG. 4B corresponds to the processing executed by the server 110. The processing illustrated in FIG. 4B is realized while the CPU 205 executes a procedure illustrated in FIG. 4B by expanding the program stored in the HDD 207. The program may be stored in the ROM 208. As an alternative configuration to the above, part or all of the processing illustrated in FIG. 4B may be performed by hardware.

The server 110 receives the update content of the management information in the multi function peripheral 120 from the multi function peripheral 120 (S421). In the example of FIG. 3A, the communication processing unit 315 receives the notification from the multi function peripheral 120. For example, the notification indicating that the address (setting information) of the address book ID1 (setting item) among the information of the address book held in the multi function peripheral 120 illustrated in Table 7 is updated from aa@xxx.co.jp to aaa@xxx.co.jp is received.

Next, the server 110 updates the management information managed in the server 110 on the basis of the content of the notification received from the multi function peripheral 120 (S422). The server 110 updates the management information with regard to the setting item where the notification of the update content is issued from the multi function peripheral 120 among the management information managed by the server 110. In this manner, the management information held in the multi function peripheral 120 and the management information held in the server 110 are synchronized with each other. In the example of FIG. 3A, the processing unit 311 updates the management information held in the database 314 in response to the instruction from the first management unit 312. For example, the address (setting information) of the address book ID1 (setting item) of the address book managed by the server 110 illustrated in Table 4 is updated from aa@xxx.co.jp to aaa@xxx.co.jp. According to the present exemplary embodiment, the server 110 determines whether or not the management information held in the server 110 is updated on the basis of time information included in the received notification. The time information included in the received notification is information indicating the time when the information is updated in the multi function peripheral 120. In a case where the time indicated by the time information included in the received notification is after a time stored in the database 314 as the update time of the management information corresponding to the notification, the management information held in the database 314 is overwritten with the notified information. On the other hand, in a case where the time indicated by the time information included in the received notification is before the time stored in the database 314 as the update time of the management information corresponding to the notification, the overwriting of the database 314 is not performed.

Next, the server 110 records the time when the management information managed in the server 110 is updated (S423). In the example of FIG. 3A, the processing unit 311 records the update time in the database 314 in accordance with the instruction from the first management unit 312. For example, a time on 2014/12/31 at 9:00 when the address (setting information) of the address book ID1 (setting item) of the address book managed by the server 110 illustrated in Table 4 is updated is recorded. In addition, in a case where the management information held in the database 314 is not overwritten with the management information included in the received notification, the update of the time is performed.

Next, the server 110 transmits a response to the multi function peripheral 120 (S424). This response is a response indicating that the notification from the multi function peripheral 120 is received by the server 110. In the example of FIG. 3A, the control unit 313 controls the communication processing unit 315 to transmit the response.

With the processing of FIGS. 4A and 4B, in a case where the management information held in the multi function peripheral 120 is updated in the multi function peripheral 120, the multi function peripheral 120 can notify the server 110 of the update content.

Next, the above-described second processing will be described with reference to FIGS. 5A and 5B. FIG. 5A corresponds to the processing executed by the multi function peripheral 120. The processing illustrated in FIG. 5A is realized while the CPU 224 executes a procedure illustrated in FIG. 5A by expanding the program stored in the HDD 227. The program may be stored in the ROM 228. As an alternative configuration to the above, part or all of the processing illustrated in FIG. 5A may be performed by hardware.

The multi function peripheral 120 periodically transmits a synchronization request of the management information to the server 110 at a predetermined time interval. This synchronization request is a transmission request for requesting transmission of the update content of the setting information held in the HDD 207 of the server 110. The multi function peripheral 120 detects that the multi function peripheral 120 reaches a transmission timing of the synchronization request on the basis of time counted by the timer unit 234 (S511).

Subsequently, the multi function peripheral 120 determines whether or not the time when the synchronization of the management information is performed with the server 110 in the previous time is recorded in the database 324 (S512).

In a case where the time when the synchronization of the management information is performed with the server 110 in the previous time is recorded in the database 324 (S512: YES), information indicating the previous synchronization time is added, and the synchronization request is transmitted to the server 110 (S513). On the other hand, in a case where the time when the synchronization of the management information is performed with the server 110 in the previous time is not recorded in the database 324 (S512: NO), the information indicating the previous synchronization time is not added, and the synchronization request is transmitted to the server 110 (S514).

The multi function peripheral 120 receives a response to the synchronization request from the server 110 and updates the management information included in the database 324 with the management information included in the response (S515). The replied management information includes the setting information of the multi function peripheral connected to the server 110 and the update content of the management information.

In a case where the synchronization request does not include the time information, all the management information held in the server 110 is replied to the multi function peripheral 120. In a case where the synchronization request includes the time information, the management information updated at or after the time indicated by the time information is replied to the multi function peripheral 120.

The multi function peripheral 120 records the update time when the management information included in the database 324 is updated with the received management information in the database 324 (S516).

Next, processing executed by the server 110 will be described with reference to FIG. 5B. The processing illustrated in FIG. 5B is realized while the CPU 205 executes a procedure illustrated in FIG. 5B by expanding the program stored in the HDD 207. The program may be stored in the ROM 208. As an alternative configuration to the above, part or all of the processing illustrated in FIG. 5B may be performed by hardware.

The server 110 receives the synchronization request from the multi function peripheral 120 (S521). Subsequently, the server 110 determines whether or not the received synchronization request includes the information indicating the update time of the management information held in the multi function peripheral 120 (S522).

In a case where the received synchronization request does not include the information indicating the update time, all the pieces of the management information held in the database 314 are obtained (S523). The case where the received synchronization request does not include the information indicating the update time is, for example, a case where the first synchronization request is performed after the client application 320 is synchronized with the server application 310, and the update of the management information held in the multi function peripheral 120 does not exist at or before the time of the synchronization request, or the like.

On the other hand, in a case where the received synchronization request includes the information indicating the update time, the management information updated after this update time is obtained from the database 314 (S524). In step S524, the server 110 obtains the management information of the setting item where the update time in the server of the management information recorded in the database 314 is after the update time in the multi function peripheral 120 which is indicated by the information included in the synchronization request.

Next, the server 110 obtains the configuration information of the multi function peripheral 120 that has issued the synchronization request (S525). As described above with reference to Table 3, the configuration information of each of the multi function peripherals is stored in the database 314. The server 110 checks the serial number of the multi function peripheral that has issued the synchronization request and obtains the configuration information corresponding to this serial number. The serial number may be included in the synchronization request. As an alternative configuration to the above, the multi function peripheral may separately notify the server of the serial number in addition to the synchronization request. The control unit 313 obtains the configuration information of the multi function peripheral that has executed the synchronization request from the database 314 via the first management unit 312 and the processing unit 311 on the basis of the notified serial number.

As described above, the configuration information is information indicating the function that can be executed by the multi function peripheral 120 and the management information that can be set. It is possible to determine the setting item of the management information that can be synchronized between the server 110 and the multi function peripheral 120 by checking the configuration information of the multi function peripheral 120.

Next, the server 110 creates the response information to the multi function peripheral 120 on the basis of the setting information obtained in step S523 or step S524 and the configuration information obtained in step S525 (S526). The response information is created by the second management unit 316 on the basis of the control of the control unit 313.

In step S526, the setting information with regard to the setting item used by the multi function peripheral 120 that has issued the synchronization request among the setting information obtained in step S523 or step S524 is extracted to generate the response information. The setting item used by the multi function peripheral 120 that has issued the synchronization request can be determined on the basis of the configuration information of the multi function peripheral 120.

Subsequently, the server 110 transmits the generated response information to the multi function peripheral 120 (S527). The control unit 313 requests the communication processing unit 315 to transmit the response information generated by the second management unit 316, and the response information is transmitted via the network 100. In this manner, the setting information selected in accordance with the configuration information of the multi function peripheral that has issued the synchronization request among the setting information held in the database 314 is transmitted to the multi function peripheral that has issued the synchronization request.

An example of processing in FIG. 5B will be described with reference to Table 3 and Table 4. Hereinafter, an example in which the server 110 and the multi function peripheral 120 synchronize the address book will be described. In a case where the synchronization request received by the server 110 in step S521 includes information indicating the update time on 2015/02/1 at 12:59 (S522: YES), the following processing is executed. That is, the server 110 obtains the setting information with regard to the address book ID2 and the address book ID3 among the information related to the address book illustrated in Table 4 (S524). With regard to the address book ID1, the update time in the server 110 is on 2014/12/31 at 9:00, which is before the update time on 2015/02/1 at 12:59 in the multi function peripheral 120. Therefore, the information of the address book ID1 is not transmitted from the server 110 to the multi function peripheral 120. On the other hand, with regard to the address book ID2 and the address book ID3, the time when the management information is updated in the server is after the update time on 2015/02/1 at 12:59 notified of from the multi function peripheral 120. In view of the above, the server 110 obtains the setting information of the address book ID2 and the address book ID3 as the candidate of the management information that the multi function peripheral 120 should be notified of. In this manner, the update content of the setting information updated at or after the time indicated by the time information included in the synchronization request with regard to the setting information held in the database 314 can be transmitted to the multi function peripheral that has issued the synchronization request.

Next, the server 110 checks the configuration information of the serial number 1234567 corresponding to the multi function peripheral 120 with reference to Table 3. In an example of Table 3, the multi function peripheral having the serial number 1234567 does not include the FAX unit. Therefore, among the setting information obtained in step S524, even when the information of the address book ID3 in which the address type is the FAX is transmitted to the multi function peripheral 120, the information is not used by the multi function peripheral 120. In view of the above, the server 110 creates the response information including only the address book ID2 among the setting information obtained in step S524 (S526) to be transmitted to the multi function peripheral 120 (S527). The server 110 checks that the address type FAX of the address book information becomes a synchronization target in a case where a state of setting.option.faxunit is ON from the condition illustrated in Table 5. Since the state of setting.option.faxunit in the multi function peripheral 120 is OFF (the multi function peripheral 120 does not include the FAX unit), the information of the address book ID3 in which the address type is FAX is not set as the synchronization target. In this manner, the setting information corresponding to the synchronization target is managed in accordance with the configuration and the state of the multi function peripheral.

Next, a function of maintaining the information of the system according to the present exemplary embodiment will be described. The system according to the present exemplary embodiment maintains the information by executing backup and restoration of the information of the database 314 held in the server 110.

According to the present exemplary embodiment, the backup of the information is executed while the system administrator performs an operation of instructing the backup of the information with respect to the server 110. As an alternative configuration to the above, the server 110 may periodically automatically perform the backup of the information in the database 314. The storage destination of the backup information may be a destination inside the server 110. As an alternative configuration to the above, the backup information may be stored in the external apparatus connected to the server 110. According to the present exemplary embodiment, a case where the backup information can be stored in both the inside and the outside of the server 110 will be described.

In addition, according to the present exemplary embodiment, the restoration of the information is executed while the system administrator performs an operation of instructing the restoration with respect to the server 110.

Figure 6:
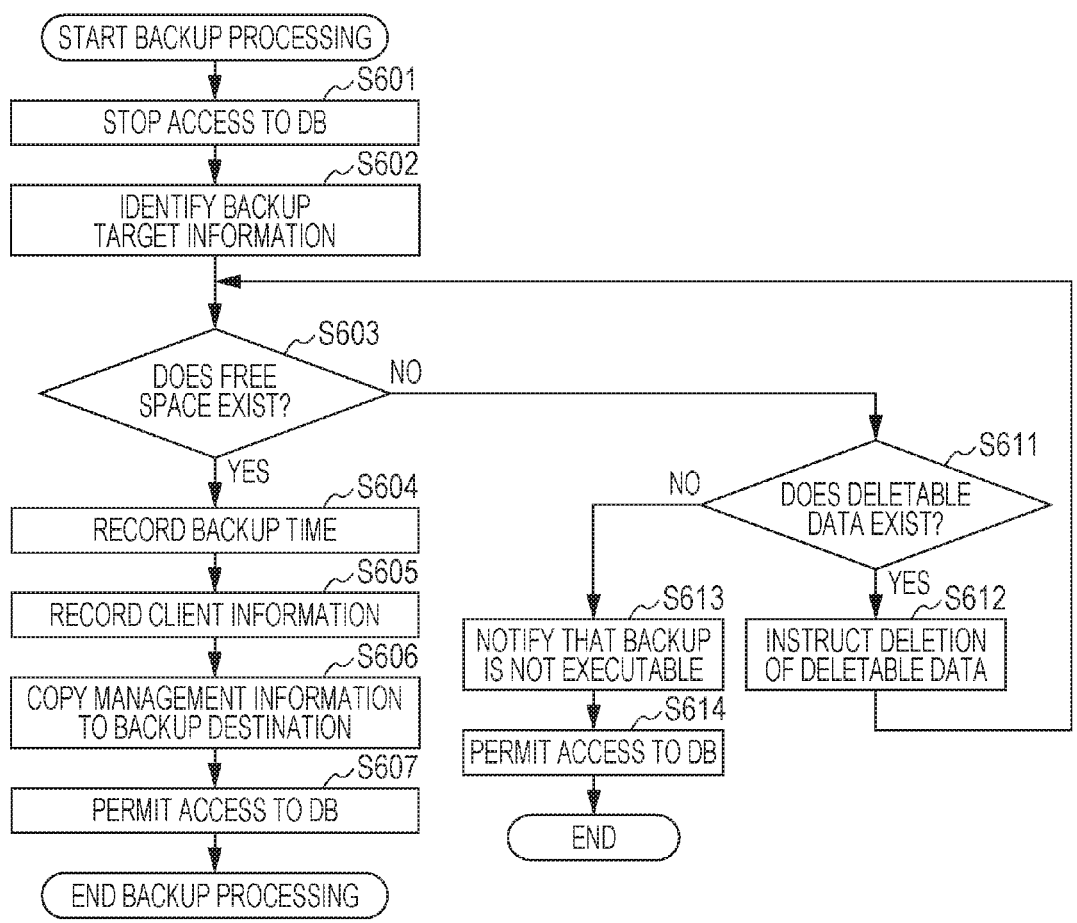
FIG. 6 is a flow chart for describing backup processing according to the first exemplary embodiment.

Processing of backing up the information of the database 314 will be described with reference to FIG. 6. FIG. 6 corresponds to the processing executed by the server 110. The processing illustrated in FIG. 6 is realized while the CPU 205 executes a procedure illustrated in FIG. 6 by expanding the program stored in the HDD 207. The program may be stored in the ROM 208. As an alternative configuration to the above, part or all of the processing illustrated in FIG. 6 may be performed by hardware. According to the present exemplary embodiment, the control unit 313 instructs the execution of the backup processing of the database 314 with respect to the third management unit 317 in accordance with an instruction of a user (system administrator) to start the processing illustrated in FIG. 6.

When the backup processing is started, the server 110 stops an access to the database 314 (S601). In step S601, a restriction is set so that the update of the database 314 is not performed. For example, when the backup processing is started, an error is replied to the notification of the update of the management information from the multi function peripheral 120. In this manner, it is possible to avoid a situation where the content of the database 314 is changed during the backup processing because of the synchronization processing of the management information with the multi function peripheral 120.

Next, the server 110 identifies the management information corresponding to the backup target (S602). Next, the server 110 determines whether or not the storage at the backup destination has a free space where the management information of the backup target can be saved (S603).

When it is determined that the management information of the backup target can be saved in the storage at the backup destination (S603: YES), the server 110 records the execution time of the backup counted by the timer unit 212 (S604).

Next, the server 110 records client information in the backup destination (S605). The client information is information indicating a list of clients where the server 110 manages the management information at the time of the execution of the backup. For example, the client information includes the serial number of the multi function peripheral where the server 110 manages the management information at the time of the execution of the backup. The client information can be obtained from information of Table 1 included in the database 314 or the like.

Next, the server 110 copies the management information of the backup target in the backup destination (S606). The order of the processing in step S605 and the processing in step S606 may be reversed.

Furthermore, the server 110 permits an access to the database 314 after the end of the processing in step S606 (S607). That is, the update of the management information held in the database 314 is permitted on the basis of the management information notified of from the multi function peripheral 120.

On the other hand, in a case where the information amount of the management information to be backed up is higher than the information amount that can be saved in the storage at the backup destination (S603: NO), it is determined whether or the deletable information exists among the information saved in the storage at the backup destination (S611). The deletable information is, for example, information that is no longer necessary such as information backed up in the past. A rule for determining whether the information is deletable can be previously set. For example, the server 110 sets information satisfying a predetermined condition that a predetermined time elapses after the information is saved as the deletable information, for example. As an alternative configuration to the above, in a case where the information amount of the management information to be backed up is higher than the information amount that can be saved in the storage at the backup destination, the use may be asked to select the deletable information.

In a case where the deletable information exists (S611: YES), the server 110 instructs the deletion of the deletable information (S612). Subsequently, the flow returns to the processing in step S603.

On the other hand, in a case where the deletable information does not exist (S611: NO), the user is notified that the backup is not executable (S613). For example, the server 110 displays a message on the display unit 202 indicating that the backup is not executable. A case where it is determined that the deletable information does not exist includes a case where the information satisfying the above-described predetermined condition is not saved in the storage for the backup, a case where the user instructs that the deletion of the information is not executed, or the like.

After the processing in step S613, the server 110 permits an access to the database 314 (S614), and the processing is ended. That is, the update of the management information held in the database 314 is permitted on the basis of the management information notified of from the multi function peripheral 120.

Figure 7:
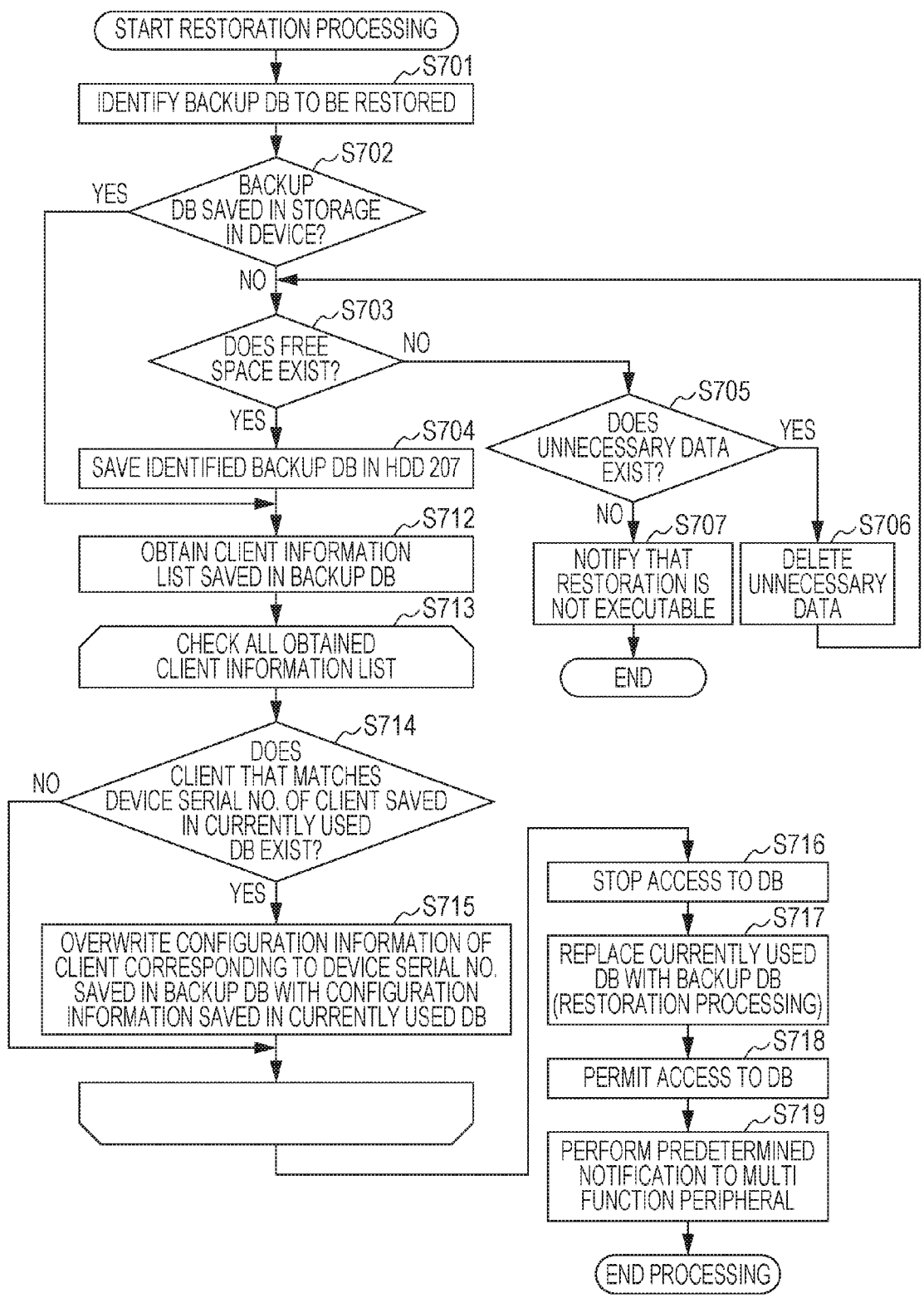
FIG. 7 is a flow chart for describing restoration processing according to the first exemplary embodiment.

Next, a detail of the restoration processing performed by the server 110 will be described with reference to FIG. 7. FIG. 7 corresponds to the processing executed by the multi function peripheral 120. The processing illustrated in FIG. 7 is realized while the CPU 224 executes a procedure illustrated in FIG. 7 by expanding the program stored in the HDD 227. The program may be stored in the ROM 228. As an alternative configuration to the above, part or all of the processing illustrated in FIG. 7 may be performed by hardware.

According to the present exemplary embodiment, the control unit 313 instructs the third management unit 317 to execute the restoration processing of the database 314 in accordance with the instruction of the user (system administrator), so that the processing illustrated in FIG. 7 is started.

First, the server 110 identifies a database to be restored (S701). The database to be restored can be identified, for example, when the user specifies a time when the database is backed up. As an alternative configuration to the above, the user may select the database to be restored by referring to the list of the database recorded in the storage to be backed up. A method of identifying the database to be restored is not particularly limited.

Next, it is determined whether or not the identified database is saved in the storage in the server 110 (S702). In a case where the identified database is backed up in a storage outside the server 110 (S702: NO), it is checked whether or not a free space in which the database can be saved exists in the server 110 (S703).

In a case where the free space exists (S703: YES), the identified database is saved in the HDD 207 (S704). After the processing in step S704 is executed, the flow proceeds to the processing in step S712 which will be described below. In a case where the free space does not exist (S703: NO), it is checked whether or not the deletable information exists in the server 110 (S705). The deletable information is information that satisfies a predetermined condition and does not cause an issue in the operation of the server 110 even when the information is deleted. For example, the server 110 sets information satisfying a predetermined condition that a predetermined time elapses since the information is saved, for example, as the deletable information. As an alternative configuration to the above, the user may be asked to select the deletable information.

In a case where the deletable information exists, deletion of this information is performed (S706), and the processing in step S703 is executed again to check the free space after the deletion. In a case where the deletable information does not exist, the user is notified that the restoration is not executable (S707), and the processing is ended.

In step S702, in a case where the identified database is saved in the storage inside the server 110 (S702: YES), the flow proceeds to the processing in step S712.

In step S712, the client information saved in the backed up database is obtained. The client information is information indicating a list of clients where the server 110 manages the management information at the time of the execution of the backup. For example, the client information includes the serial number of the multi function peripheral where the server 110 manages the management information at the time of the execution of the backup. The processing in step S714 and step S715 which will be described below is executed with respect to all of one or a plurality of clients (multi function peripherals) obtained in step S712.

In step S714, the serial number of the multi function peripheral where the server 110 manages the management information at the time of the execution of the backup is extracted from the client information. Subsequently, it is determined whether or not each of the multi function peripherals having the serial number extracted from the client information is also currently connected to the server 110.

In a case where the multi function peripheral identified by the client information is also currently connected to the server 110 (step S714: YES), the following update processing is performed. That is, with regard to the configuration information among the backup information related to the multi function peripheral, the backup information is updated by the configuration information related to the multi function peripheral which is currently held in the server 110 (S715). On the other hand, in a case where the multi function peripheral identified by the client information is not currently connected to the server 110, the backup information is not updated, and the determination in step S714 with regard to the next multi function peripheral indicated by the client information is executed.

When the execution of the processing in step S714 and step S715 is ended with respect to all the clients indicated by the client information held in the backup information, the server 110 executes the processing in step S716.

In step S716, an access to the database 314 is stopped. That is, a restriction is set so that the content of the database 314 is not updated with the information notified of from the client.

Subsequently, the restoration processing is performed on the database 314. According to the present exemplary embodiment, the management information held in the database 314 is deleted. Subsequently, the backup information after the update is held in the database 314. This backup information after the update is information after the processing from step S713 to step S715 is performed. That is, this information is the update information obtained by updating the configuration information included in the backup information before the update, by using the configuration information held in the HDD 207 after the time of the backup before the execution of the restoration.

While the database 314 is restored by using the backup information after the processing from step S713 to step S715, the setting information at the time of the backup can be held in the HDD 207. In addition, the configuration information held in the HDD 207 after the time of the backup before the execution of the restoration can be held in the HDD 207 after the restoration.

According to the present exemplary embodiment, the case has been described in which the restoration processing is performed on the information of the database 314 after the backup information read out from the storage at the backup destination is processed, but the configuration is not limited to this. After the configuration information of each of the multi function peripherals is read out to be separately held before the restoration processing is executed on the database 314, the information of the database 314 is overwritten with the backup information read out from the storage at the backup destination. Subsequently, the content of the database 314 may be rewritten with the separately held configuration information. The separately held configuration information is the configuration information on which the update after the time of the backup is reflected.

When the restoration processing in step S717 is completed, an access to the database 314 is permitted, and the synchronization processing of the management information with the multi function peripheral 120 is resumed (S718).

When the restoration processing is completed, the server 110 performs a predetermined notification with respect to the connected multi function peripheral (S719). This notification is a notification for the server 110 to instruct the multi function peripheral to obtain the management information held in the database 314. When this notification is received from the server 110, the multi function peripheral 120 issues the synchronization request to the server 110. This synchronization request is similar to the synchronization request executed in step S514 described with reference to FIG. 5A. That is, while the information indicating the previous synchronization time is not added to this synchronization request, the synchronization request is transmitted to the server 110.

When the synchronization request that does not include the information indicating the synchronization time is received, as described with reference to FIG. 5B, the server 110 executes the processings from step S523 to step S527. That is, the management information in accordance with the configuration information of the multi function peripheral 120 that has issued the synchronization request among all the management information held in the database 314 is extracted to be transmitted to the multi function peripheral 120.

In this manner, the management information held in the database 314 after the restoration is shared by the respective multi function peripherals connected to the server 110, and the management information after the restoration is shared as a system as a whole.

The predetermined notification in step S719 may be issued in response to the synchronization request periodically executed in the multi function peripheral described with reference to FIG. 5A.

In addition, instead of the predetermined notification in step S719, the server 110 may transmit all the management information held in the database 314 to all the multi function peripherals connected to the server 110. In this case, each of the multi function peripherals extracts the management information in accordance with its own configuration information among the received management information to be set for itself, so that it is possible to perform the synchronization of the management information between the server and the multi function peripheral.

With the above-described processing, even in a case where the restoration is performed in the server, the restoration is performed after the backup data is updated so that the consistency between the configuration information of the client held in the server and the configuration of the actual client can be maintained. Therefore, the sharing of the management information in accordance with the configuration of the client can be continued even after the restoration processing.

With the above-described processing, the configuration information held in the multi function peripheral 120 after the time when the backup information is backed up can be held in the HDD 207 after the restoration.

According to the present exemplary embodiment, the configuration information of the backup information can be updated with regard to only the multi function peripheral where the management information is managed at the time of the backup by executing the processing in step S712 to step S715. Accordingly, the processing load of the server 110 can be reduced as compared with a case where the determination is made whether or not the configuration information of all the multi function peripherals included in the backup information needs to be updated with the configuration information currently held in the database 314, and also, the processing time can be shortened.

In addition, according to the above-described configuration, even in a case where the user performs the restoration processing while intending to return the state of the server to the state before the multi function peripheral connected to the server 110 after the backup processing is connected, it is possible to realize the restoration processing in accordance with the intention of the user.

It should be noted however that the configuration in which it is determined whether or not the configuration information of all the multi function peripherals included in the backup information needs to be updated is not excluded from the scope of the present invention. With the processing of determining the necessity of the update with regard to the configuration information of all the multi function peripherals included in the backup information too, the advantage of the present invention can be attained that it is possible to realize the synchronization of the management information of the type in accordance with the configuration of the multi function peripheral even after the restoration processing.

In addition to the above-described processing described with reference to FIG. 7, processing of obtaining an instruction on whether or not the processing in step S715 (update processing of the configuration information included in the backup information) is executed from the user may be performed. Subsequently, in a case where the user does not desire the processing in step S715, the execution of the processing in step S715 may be avoided.

According to the above-described configuration, even when the inconsistency occurs between the configuration information of the multi function peripheral held in the server 110 and the configuration of the actual multi function peripheral, in a case where the user desires to return the state of the server 110 to the state at the time of the backup as it is, the restoration processing in accordance with the intention of the user can be realized.

In addition, the following configuration may be provided as processing of recovering the configuration information held in the server 110 since the configuration information held in the server 110 is damaged at a time after the backup. That is, after the connection between the server 110 and the client (for example, the multi function peripheral) is once established, the connection is established again. When the client starts the connection with the server 110, the server 110 is notified of all the setting information and the configuration information held in the client. Accordingly, since the server 110 is notified of the configuration information currently held in the client, the configuration information held in the server 110 can be recovered with the current configuration information of the client.

Second Exemplary Embodiment

According to a second exemplary embodiment, a configuration will be described in which the inconsistency of the configuration information held between the server and the client is eliminated while the client notifies the server of the current configuration information after the restoration processing.

Since the configuration of the system is similar to the configuration described with reference to FIG. 1, FIGS. 2A and 2B, and FIGS. 3A and 3B according to the first exemplary embodiment, the description thereof will be omitted.

Figure 8A:
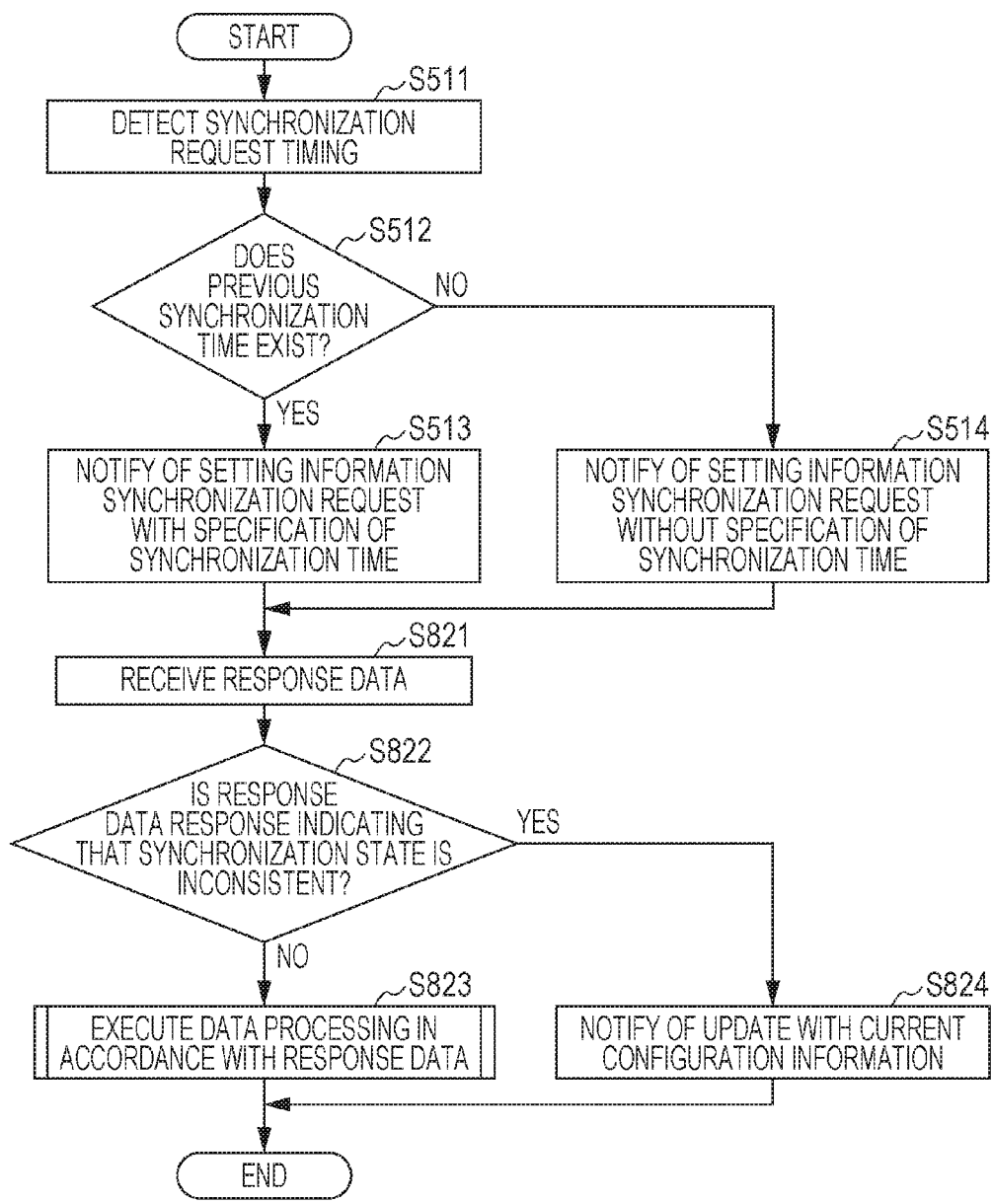

The restoration processing according to the present exemplary embodiment will be described with reference to FIGS. 8A and 8B.

First, the processing executed by the server 110 will be described with reference to FIG. 8B. The processing illustrated in FIG. 8B is realized while the CPU 205 executes a procedure illustrated in FIG. 8B by expanding the program stored in the HDD 207. The program may be stored in the ROM 208. As an alternative configuration to the above, part or all of the processing illustrated in FIG. 8B may be performed by hardware.

When the restoration instruction is received from the user, the control unit 313 instructs the third management unit 317 to execute the restoration. The server 110 determines whether or not the received instruction is the instruction of the restoration execution (S801). When the instruction determined in step S801 is an instruction other than the restoration instruction (S801: NO), processing in conformity to the execution instruction is executed (S802). When the execution of the restoration is instructed (S801: YES), the server 110 identifies the data of the restoration target. In step S803, as described with reference to step S702 to step S707 in FIG. 7 according to the first exemplary embodiment, it is possible to execute the processing of securing the storage capacity for reading out the backup information in its own apparatus.

When the data of the restoration target is identified in step S803, an access to the database 314 is stopped (S804). Next, processing of substituting the currently used database with the backup information is executed (S805), and a time when the substitution is performed is identified and saved (S806). Herein, information of the identified time may be written to a separately prepared file or the like or may be saved as one of the setting information of the substituted database 314. After the restoration, an access to the database 314 is permitted (S807).

Subsequently, the server 110 receives the notification from the multi function peripheral 120 (S808) and determines whether or not the received notification is the update notification of the configuration information in the multi function peripheral 120 (S809). In a case where the received notification is not the update notification of the configuration information (S809: NO), it is determined whether or not the multi function peripheral 120 that has performed the notification notifies the server 110 of the configuration information after the restoration processing (S810). Herein, a case where the notification from the multi function peripheral 120 is not the update notification of the configuration information includes, for example, a case of a transmission request (synchronization request) of the update content of the setting information held in the database 314 or the like.

The check of the notification status of the configuration information in step S810 can be performed by comparing the execution time of the restoration saved in step S806 with the update time in the server of the configuration information. As an alternative configuration to the above, processing of turning on a flag may be performed in a case where the notification of the configuration information from the multi function peripheral exists, and the notification status of the configuration information may be checked on the basis of a status of the flag.

In a case where the notification of the configuration information is performed (S810: YES), the processing corresponding to the processing request is executed (S812). In a case where the update notification of the configuration information is not performed after the restoration execution (S810: NO), an error for notifying of the inconsistency of the configuration information is replied (S813). At this time, the notified content may be a response functioning as a trigger for the multi function peripheral 120 to execute the notification of the configuration information instead of the error. This error response is an instruction for transmitting the configuration information held in the multi function peripheral 120 from the multi function peripheral 120 to the server 110. This instruction is transmitted, for example, to the multi function peripheral that has issued the synchronization request with respect to the server 110.

On the other hand, in a case where the notification of the configuration information is performed from the multi function peripheral 120 in step S809, the processing from step S712 to step S718 described with reference to FIG. 7 according to the first exemplary embodiment is executed, and the update of the configuration information held in the database 314 is performed (S811).

The server 110 transmits the response information created in step S811, step S812, or step S813 to the multi function peripheral 120 (S814).

Next, the processing executed by the multi function peripheral 120 according to the present exemplary embodiment will be described with reference to FIG. 8A. The processing illustrated in FIG. 8A is realized while the CPU 224 executes a procedure illustrated in FIG. 8A by expanding the program stored in the HDD 227. The program may be stored in the ROM 228. As an alternative configuration to the above, part or all of the processing illustrated in FIG. 8A may be performed by hardware.

The multi function peripheral 120 notifies the server 110 of the synchronization request. As the notification processing of the synchronization request, the processing described with reference to step S511 to step S513 in FIG. 5A according to the first exemplary embodiment is executed. The notification processing of the update of the management information described with reference to FIGS. 4A and 4B may be performed instead of the notification of the synchronization request.

The multi function peripheral 120 receives the response information to the transmitted notification (S821) and determines whether or not the content of the response information is the error response for notifying of the inconsistency of the configuration information (S822).

In a case where the content of the response information is a response notifying of the inconsistency of the configuration information, the multi function peripheral 120 performs notification of the configuration information of the multi function peripheral 120 (S824). The server 110 updates the configuration information transmitted from the multi function peripheral 120 with the configuration information held in the database 314 in response to the error response notifying of the inconsistency.

In a case where the response information corresponds to the normal synchronization processing, the information processing in accordance with the response information is executed (S823), and the processing is ended.

According to the present exemplary embodiment, after the restoration processing is executed, with respect to the multi function peripheral 120 that has performed the notification to the server 110, the server 110 issues a response for the multi function peripheral 120 to notify the server 110 of the current configuration information of the multi function peripheral 120.

In this manner, while the multi function peripheral 120 certainly notifies the server 110 of the current configuration information after the restoration, it is possible to eliminate the inconsistency state between the configuration information of the multi function peripheral held in the server 110 and the actual configuration of the multi function peripheral by the restoration processing.

According to the present exemplary embodiment, even in a case where the configuration information held in the server 110 is damaged, the configuration information held in the server 110 can be overwritten with the configuration information indicating the current configuration of the client to realize the recovery.

When the notification of the configuration information from all the clients is completed after the restoration, the processing executed by the server 110 may be switched to the processing flow illustrated in FIG. 4B and FIG. 5B.

Third Exemplary Embodiment

According to a third exemplary embodiment, the server 110 issues a predetermined response to the client that has performed the notification with respect to the server 110 after the restoration processing. This response includes the configuration information held in the server 110 with regard to the client that has performed the notification. The client checks whether or not the configuration information included in the response is consistent with its own actual configuration. In a case where the configuration information included in the response is different from the configuration of the actual client, the client notifies the server 110 of the configuration information indicating the current configuration. The server 110 overwrites the held configuration information with the notified configuration information.

In this manner, the configuration information held in the server 110 and the actual configuration of the client can be consistent with each other even after the restoration.

Since the configuration of the system is similar to the configuration described with reference to FIG. 1, FIGS. 2A and 2B, and FIGS. 3A and 3B according to the first exemplary embodiment, the description thereof will be omitted.

The restoration processing according to the present exemplary embodiment will be described with reference to FIGS. 9A and 9B.

First, the processing executed by the server 110 will be described with reference to FIG. 9B. The processing illustrated in FIG. 9B is realized while the CPU 205 executes a procedure illustrated in FIG. 9B by expanding the program stored in the HDD 207. The program may be stored in the ROM 208. As an alternative configuration to the above, part or all of the processing illustrated in FIG. 9B may be performed by hardware.

Figure 9A:
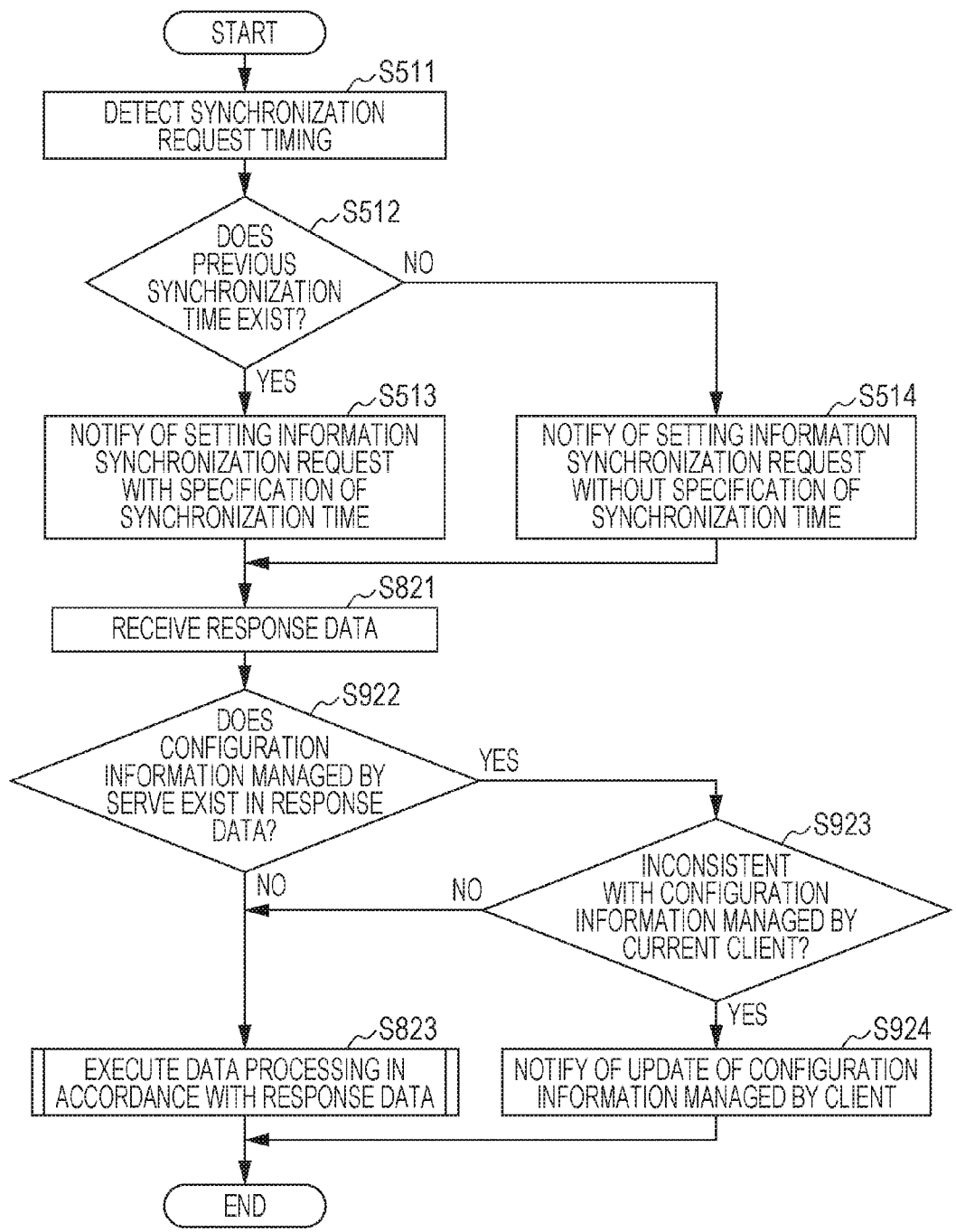
FIGS. 9A and 9B are flow charts for describing the restoration processing according to a third exemplary embodiment.
Figure 9B:
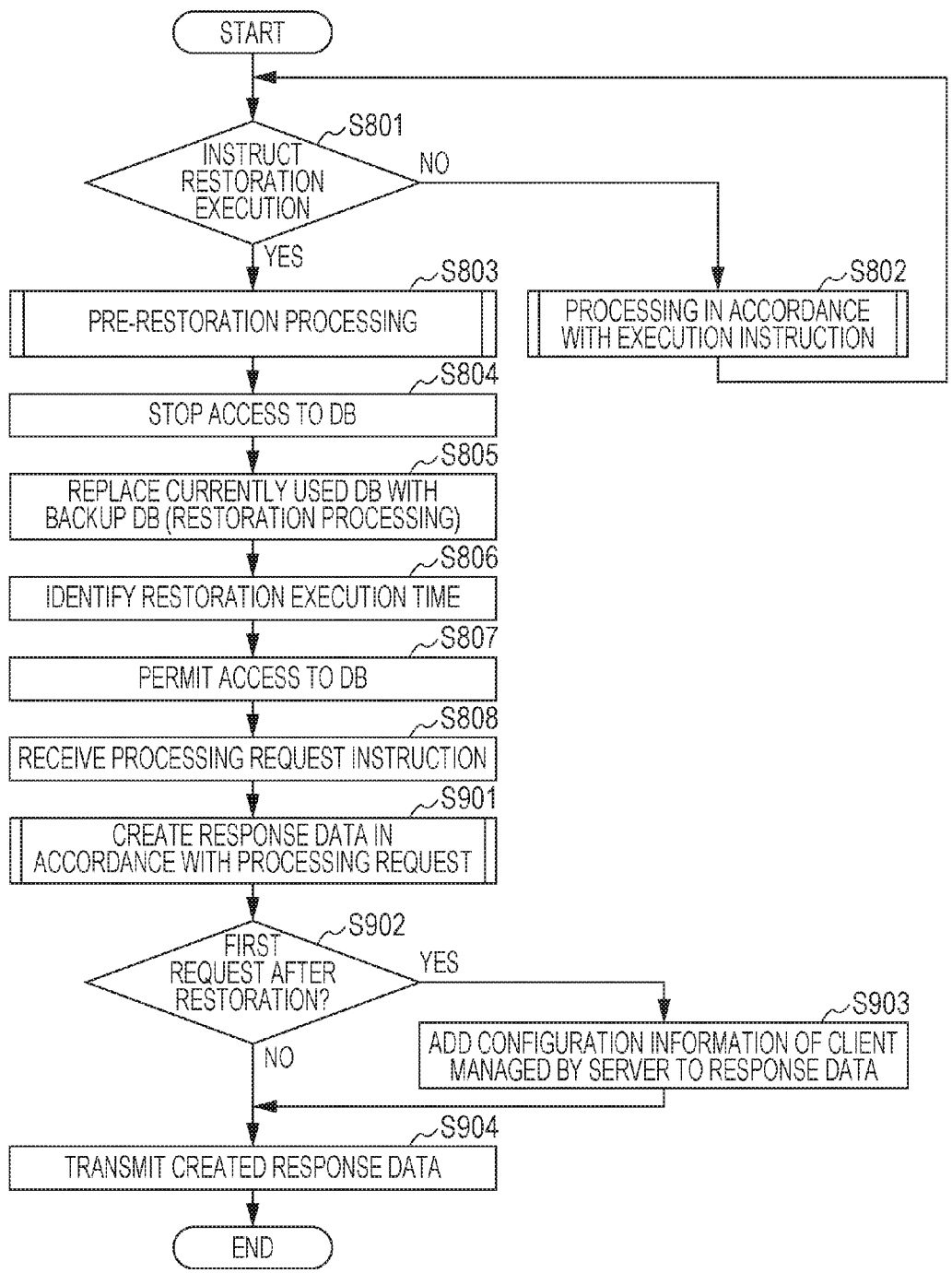

Since step S801 to step S808 in FIG. 9B are similar to the contents described according to the second exemplary embodiment, the same reference symbols are assigned, and the description thereof will be omitted.

After the processing request is received from the multi function peripheral 120 (S808), the server 110 executes the creation flow of the response information described with reference to FIGS. 5A and 5B in the case of the synchronization request and executes the creation flow of the response information described with reference to FIGS. 4A and 4B in the case of the update request (S901).

Next, the client that has executed the processing request determines whether or not the request is the first processing request after the restoration (S902). In the case of the first processing request (S902: YES), the configuration information of the client managed on the server side is added to the response information to create the response information (S903). Subsequently, the created response information is transmitted to the multi function peripheral 120 (S904). The configuration information held in the database 314 in the above-described manner is transmitted to the multi function peripheral 120. In this manner, the configuration information held in the database 314 is transmitted to the multi function peripheral 120 after the restoration.

Next, the processing executed by the multi function peripheral 120 according to the present exemplary embodiment will be described with reference to FIG. 9A. The processing illustrated in FIG. 9A is realized while the CPU 224 executes a procedure illustrated in FIG. 9A by expanding the program stored in the HDD 227. The program may be stored in the ROM 228. As an alternative configuration to the above, part or all of the processing illustrated in FIG. 9A may be performed by hardware.

Since the processing in step S511 to step S821 illustrated in FIG. 9A is similar to the contents described according to the first and second exemplary embodiments, the same reference symbols are assigned, and the description thereof will be omitted.

The multi function peripheral 120 receives the response information from the server 110 (S821), and it is determined whether or not the configuration information managed by the server 110 is included in the information included in the response information (S922).

In a case where the configuration information exists in the response information (S922: YES), the configuration information included in the response information is compared with the current configuration information of the multi function peripheral 120 (S923).

In step S923, in a case where the configuration information included in the response information is different from the current configuration information of the multi function peripheral 120, the server 110 is notified of the current configuration information of the multi function peripheral 120 (S924). The server 110 updates the configuration information held in the database 314 with the configuration information (configuration information notified in S924) transmitted from the multi function peripheral 120 in response to the transmission of the configuration information from the server 110 to the multi function peripheral 120.

On the other than, in a case where the configuration information is not included in the response information determined in step S922 or a case where the included configuration information is matched with the configuration information managed by the current client determined in step S923, the processing in accordance with the response information is executed (S823), and the processing is ended.

According to the above-described configuration, the configuration information held in the server 110 and the actual configuration of the client can be set to be consistent with each other even after the restoration.

Other Exemplary Embodiments

The first, second, and third exemplary embodiments have been described, but the exemplary embodiments described above are examples for carrying out the present invention. The present invention may be realized by combining processings and operations of the respective exemplary embodiments with each other, and the present invention is not limited to the configurations of the exemplary embodiments.

In addition, the configuration is not necessarily limited to a configuration in which the client of the present invention is the multi function peripheral. The configuration may be applied to an information device terminal or the like configured to manage the setting information and also in which a change is made to the setting information by information constituting the device. For example, the configuration can be applied to an information processing apparatus having a configuration of a personal computer, a mobile phone terminal, a smart phone terminal, an image forming apparatus, an electronic watch, an electronic organizer, or the like.

According to the above-described exemplary embodiments, even in a case where the restoration is performed in the server, the consistency between the configuration information of the client held in the server and the configuration of the actual client can be maintained. Therefore, the sharing of the setting information of the type in accordance with the configuration of the client can be realized even after the restoration processing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132177, filed Jun. 30, 2015, which is hereby incorporated by reference herein in its entirety.

What is claimed is:

1. An information processing apparatus comprising:
a memory device that stores a set of instructions; and
at least one processor that executes the instructions to:
receive from an image forming apparatus:
setting information used for the image forming apparatus to operate; and
configuration information indicating a function of the image forming apparatus;
hold, in a holding unit, a database including the received setting information and the received configuration information;
perform control in a manner that the setting information and the configuration information held in the holding unit are stored as backup information in a storage unit; and
perform control in a manner that, in a case where restoration using the backup information stored in the storage unit is instructed, a copy of the configuration information included in the database is held in the information processing apparatus before the backup information is restored, the backup information including the setting information and the configuration information is restored in the holding unit, and, at least part of the configuration information of the restored backup information in the holding unit is updated with the held copy of the configuration information, wherein the setting information of the restored backup information in the holding unit is not updated with the held copy.

2. The information processing apparatus according to claim 1, wherein the at least one processor executes the instructions to:
transmit, to the image forming apparatus, an instruction of transmitting the configuration information held in the image forming apparatus to the information processing apparatus; and
perform control in a manner that the instruction to the image forming apparatus is transmitted after the restoration is executed, and the configuration information held in the holding unit is updated with the configuration information transmitted from the image forming apparatus in accordance with the instruction.

3. The information processing apparatus according to claim 1, wherein the at least one processor executes the instructions to:
preform control in a manner that the setting information and the configuration information held in the holding unit are stored as backup information in a storage unit in the information processing apparatus or a storage unit installed outside the information processing apparatus and connected to the information processing apparatus.

4. The information processing apparatus according to claim 1, wherein the information processing apparatus is an image forming apparatus having a printing function.

5. The information processing apparatus according to claim 1, wherein the configuration information includes at least one of version information of firmware of the image forming apparatus, information on the presence or absence of a facsimile unit with regard to the image forming apparatus, and information on the presence or absence of a finisher with regard to the image forming apparatus.

6. An information processing apparatus comprising:
a memory device that stores a set of instructions; and
at least one processor that executes the instructions to:
receive from an image forming apparatus:
setting information used for the image forming apparatus to operate; and
configuration information indicating a function of the image forming apparatus;
hold, in a holding unit, the received setting information and the received configuration information;
perform control in a manner that the setting information and the configuration information held in the holding unit are stored as backup information in a storage unit; and
perform control in a manner that, in a case where restoration with respect to the holding unit is executed by using the backup information stored in the storage unit, the configuration information held in the image forming apparatus after a time when the backup information is stored in the storage unit is held in the holding unit after the restoration,
wherein the at least one processor executes the instructions to:
receive a transmission request of update information about the setting information held in the holding unit from the image forming apparatus,
transmit setting information selected in accordance with the configuration information of the image forming apparatus that has issued the transmission request from among the setting information held in the holding unit to the image forming apparatus that has issued the transmission request, and transmit update information about the setting information updated at or after a time indicated by time information included in the transmission request with regard to the setting information held in the holding unit to the image forming apparatus that has issued the transmission request.

7. An information processing apparatus comprising:
a memory device that stores a set of instructions; and
at least one processor that executes the instructions to:
receive from an image forming apparatus:
  setting information used for the image forming apparatus to operate; and
  configuration information indicating a function of the image forming apparatus;
hold, in a holding unit, the received setting information and the received configuration information;
perform control in a manner that the setting information and the configuration information held in the holding unit are stored as backup information in a storage unit; and
perform control in a manner that, in a case where restoration with respect to the holding unit is executed by using the backup information stored in the storage unit, the configuration information held in the image forming apparatus after a time when the backup information is stored in the storage unit is held in the holding unit after the restoration,
wherein the at least one processor executes the instructions to:
transmit the instruction to the image forming apparatus after the restoration is executed,
update the configuration information held in the holding unit with the configuration information transmitted from the image forming apparatus in accordance with the instruction, and
receive a transmission request of update information about the setting information held in the holding unit from the image forming apparatus, and
perform control in a manner that the instruction is transmitted to the image forming apparatus that has issued the transmission request.

8. An information processing apparatus comprising:
a memory device that stores a set of instructions; and
at least one processor that executes the instructions to:
receive from an image forming apparatus:
  setting information used for the image forming apparatus to operate; and
  configuration information indicating a function of the image forming apparatus;
hold, in a holding unit, the received setting information and the received configuration information;
perform control in a manner that the setting information and the configuration information held in the holding unit are stored as backup information in a storage unit; and
perform control in a manner that, in a case where restoration with respect to the holding unit is executed by using the backup information stored in the storage unit, the configuration information held in the image forming apparatus after a time when the backup information is stored in the storage unit is held in the holding unit after the restoration,
wherein the at least one processor executes the instructions to:
transmit the configuration information held in the holding unit to the image forming apparatus, and
perform control in a manner that the configuration information held in the holding unit is transmitted to the image forming apparatus after the restoration and control in a manner that the configuration information held in the holding unit is updated with the configuration information transmitted from the image forming apparatus in response to the transmission of the configuration information.

9. An information processing system in which an information processing apparatus is connected to an image forming apparatus, the information processing system comprising:
at least one memory device that stores a set of instructions; and
at least one processor that executes the instructions to:
receive from the image forming apparatus:
  setting information used for the image forming apparatus to operate; and
  configuration information indicating a function of the image forming apparatus;
hold, in a holding unit, a database including the received setting information and the received configuration information;
perform control in a manner that the setting information and the configuration information held in the holding unit are stored as backup information in a storage unit; and
perform control in a manner that, in a case where restoration using the backup information stored in the storage unit is instructed, a copy of the configuration information included in the database is held in the information processing apparatus before the backup information is restored, the backup information including the setting information and the configuration information is restored in the holding unit, and, at least part of the configuration information of the restored backup information in the holding unit is updated with the held copy of the configuration information, wherein the setting information of the restored backup information in the holding unit is not updated with the held copy.

10. A control method for an information processing apparatus, the control method comprising:
receiving from an image forming apparatus:
  setting information used for the image forming apparatus to operate; and
  configuration information indicating a function of the image forming apparatus;
holding a database including the received setting information and the received configuration information in a holding unit;
performing first control in a manner that the setting information and the configuration information held in the holding unit are stored as backup information in a storage unit; and
performing second control in a manner that, in a case where restoration using the backup information stored in the storage unit is instructed, a copy of the configuration information included in the database is held in the information processing apparatus before the backup information is restored, the backup information including the setting information and the configuration information is restored in the holding unit, and, at least part of the configuration information of the restored backup information in the holding unit is updated with the held copy of the configuration information, wherein the setting information of the restored backup information in the holding unit is not updated with the held copy.

11. A non-transitory computer readable storage medium storing computer executable instructions that cause a computer to perform:
- a reception procedure for receiving from an image forming apparatus:
  - setting information used for the image forming apparatus to operate; and
  - configuration information indicating a function of the image forming apparatus;
- a holding procedure for holding a database including the received setting information and the received configuration information in a holding unit;
- a first control procedure for performing control in a manner that the setting information and the configuration information held in the holding unit are stored as backup information in a storage unit; and
- a second control procedure for performing control in a manner that, in a case where restoration using the backup information stored in the storage unit is instructed, a copy of the configuration information included in the database is held in the computer before the backup information is restored, the backup information including the setting information and the configuration information is restored in the holding unit, and, at least part of the configuration information of the restored backup information in the holding unit is updated with the held copy of the configuration information, wherein the setting information of the restored backup information in the holding unit is not updated with the held copy.

* * * * *